(12) United States Patent
Kawashita et al.

(10) Patent No.: US 10,886,714 B2
(45) Date of Patent: Jan. 5, 2021

(54) BRANCHING CIRCUIT BODY AND BRANCHING METHOD OF ELECTRIC WIRES

(71) Applicant: Yazaki Corporation, Tokyo (JP)

(72) Inventors: Kazuyuki Kawashita, Kakegawa (JP); Kotei O, Kakegawa (JP); Junichi Tatsumi, Susono (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 16/374,316

(22) Filed: Apr. 3, 2019

(65) Prior Publication Data

US 2019/0312419 A1 Oct. 10, 2019

(30) Foreign Application Priority Data

Apr. 4, 2018 (JP) ................. 2018-072365

(51) Int. Cl.
| | |
|---|---|
| H02G 3/04 | (2006.01) |
| H01B 7/00 | (2006.01) |
| H01R 13/6592 | (2011.01) |
| H01R 13/66 | (2006.01) |
| H01R 31/02 | (2006.01) |
| H02G 15/08 | (2006.01) |
| H01R 4/38 | (2006.01) |
| H01R 4/02 | (2006.01) |

(52) U.S. Cl.
CPC ......... *H02G 3/0481* (2013.01); *H01B 7/0045* (2013.01); *H01R 13/6592* (2013.01); *H01R 13/66* (2013.01); *H01R 31/02* (2013.01); *H01R 4/021* (2013.01); *H01R 4/38* (2013.01); *H02G 15/08* (2013.01)

(58) Field of Classification Search
CPC combination set(s) only.
See application file for complete search history.

(56) References Cited

U.S. PATENT DOCUMENTS

| | | | | |
|---|---|---|---|---|
| 883,409 | A * | 3/1908 | Kruger | H01R 4/186 174/71 R |
| 1,755,898 | A * | 4/1930 | Root | F16L 41/12 285/133.4 |
| 1,983,928 | A * | 12/1934 | Brown | H04R 25/04 174/70 R |
| 2,166,420 | A * | 7/1939 | Robertson | H01B 7/0063 174/72 A |
| 2,209,560 | A * | 7/1940 | Carlson | H02G 5/06 439/114 |

(Continued)

FOREIGN PATENT DOCUMENTS

| | | |
|---|---|---|
| JP | 2006-310474 A | 11/2006 |
| JP | 2009-038032 A | 2/2009 |

(Continued)

*Primary Examiner* — Jenny L Wagner
*Assistant Examiner* — Krystal Robinson
(74) *Attorney, Agent, or Firm* — Banner & Witcoff, Ltd.

(57) ABSTRACT

A branching circuit body includes a first electric wire, a first shield tube which covers the first electric wire, a second electric wire which is electrically connected to the first electric wire and drawn out through an opening formed in the first shield tube, a second shield tube which covers the second electric wire and has an end portion inserted into the opening, and a coupling band for joining the second shield tube to the first shield tube.

6 Claims, 14 Drawing Sheets

(56) References Cited

U.S. PATENT DOCUMENTS

| | | | | |
|---|---|---|---|---|
| 2,248,044 A * | 7/1941 | Dehmel | H04B 3/34 | 174/33 |
| 2,267,006 A * | 12/1941 | Xenis | H01R 25/003 | 337/188 |
| 2,299,140 A * | 10/1942 | Hanson | H01B 7/0045 | 174/72 A |
| 2,595,452 A * | 5/1952 | Geist | H02G 3/0487 | 174/68.3 |
| 2,639,312 A * | 5/1953 | Kerwin | H02G 15/18 | 174/138 F |
| 2,845,521 A * | 7/1958 | Trickle, Jr. | B23K 1/0004 | 219/85.14 |
| 2,925,459 A * | 2/1960 | Priaroggia | H02G 15/10 | 174/73.1 |
| 2,956,109 A * | 10/1960 | Greco | H02G 15/18 | 174/138 F |
| 2,991,328 A * | 7/1961 | Lay | H01B 7/0045 | 174/72 A |
| 3,013,108 A * | 12/1961 | Sweeney | H01R 13/533 | 174/99 R |
| 3,023,692 A * | 3/1962 | Crown | H02G 3/0456 | 100/1 |
| 3,138,657 A * | 6/1964 | Wengen | H02G 15/18 | 174/92 |
| 3,175,032 A * | 3/1965 | Strauss | H02G 15/24 | 174/93 |
| 3,180,923 A * | 4/1965 | Gow | H02G 3/0487 | 174/72 A |
| 3,192,377 A * | 6/1965 | Abolins | B60Q 1/0088 | 362/485 |
| 3,207,839 A * | 9/1965 | Joly | H02G 3/00 | 174/72 C |
| 3,246,076 A * | 4/1966 | Stoneburner | H02G 3/24 | 174/157 |
| 3,289,260 A * | 12/1966 | Buscall, Jr. | H01B 17/16 | 24/129 R |
| 3,445,809 A * | 5/1969 | McLoad | G01V 1/201 | 367/188 |
| 3,497,245 A * | 2/1970 | Metzger | F16L 41/021 | 285/130.1 |
| 3,627,903 A * | 12/1971 | Plummer | H01B 7/0045 | 174/72 A |
| 3,707,865 A * | 1/1973 | Oriani | H01R 4/029 | 72/340 |
| 3,711,633 A * | 1/1973 | Ghirardi | H02G 15/18 | 174/135 |
| 3,781,765 A * | 12/1973 | Schleicher | H01R 13/502 | 439/472 |
| 3,819,848 A * | 6/1974 | Fry | H01B 7/0838 | 174/72 A |
| 3,949,457 A * | 4/1976 | Fortsch | H01R 43/00 | 29/755 |
| 3,984,622 A * | 10/1976 | Ross | H01B 7/0045 | 174/72 A |
| 4,103,940 A * | 8/1978 | Bills | F16L 41/084 | 285/189 |
| 4,114,014 A * | 9/1978 | Shogo | H01B 13/01245 | 219/56 |
| 4,229,613 A * | 10/1980 | Braun | B29D 23/001 | 138/103 |
| 4,254,422 A * | 3/1981 | Kloepfer | H01Q 9/16 | 343/792 |
| 4,467,002 A * | 8/1984 | Crofts | B29C 61/0616 | 428/34.9 |
| 4,470,622 A * | 9/1984 | Pate | F16L 3/1236 | 285/419 |
| 4,478,252 A * | 10/1984 | McLoughlin | B29C 61/10 | 138/140 |
| 4,543,583 A * | 9/1985 | Wurdack | H01Q 1/16 | 343/792 |
| 4,576,666 A * | 3/1986 | Harris | B29C 66/52231 | 156/85 |
| 4,626,067 A * | 12/1986 | Watson | G02B 6/4472 | 385/86 |
| 4,739,801 A * | 4/1988 | Kimura | F16G 13/10 | 138/120 |
| 4,756,643 A * | 7/1988 | Hurley | E02B 11/00 | 405/36 |
| 4,822,434 A * | 4/1989 | Sawaki | B29C 35/0888 | 156/275.5 |
| 4,859,020 A * | 8/1989 | Deusser | G02B 6/4415 | 385/53 |
| 4,874,908 A * | 10/1989 | Johansson | H02B 1/202 | 174/72 A |
| 4,881,995 A * | 11/1989 | Arenz | H01R 4/72 | 156/52 |
| 4,986,575 A * | 1/1991 | Braun | H02G 3/0468 | 285/133.11 |
| 5,012,391 A * | 4/1991 | Schultz, Jr. | H05K 3/103 | 174/251 |
| 5,105,054 A * | 4/1992 | Kirma | H01R 13/6592 | 174/2 |
| 5,125,060 A * | 6/1992 | Edmundson | G02B 6/2804 | 385/100 |
| 5,126,507 A * | 6/1992 | Kirma | H05K 9/00 | 138/108 |
| 5,210,812 A * | 5/1993 | Nilsson | G02B 6/2804 | 385/100 |
| 5,234,360 A * | 8/1993 | Kramer, Jr. | H01R 25/003 | 439/367 |
| 5,267,338 A * | 11/1993 | Bullock | G02B 6/447 | 385/100 |
| 5,271,585 A * | 12/1993 | Zetena, Jr. | G02B 6/4459 | 174/95 |
| 5,352,855 A * | 10/1994 | Potter | H02G 3/0481 | 174/135 |
| 5,367,126 A * | 11/1994 | Kikuchi | H01B 7/0045 | 174/135 |
| 5,378,853 A * | 1/1995 | Clouet | H01R 13/6593 | 174/36 |
| 5,381,501 A * | 1/1995 | Cardinal | G02B 6/0006 | 385/134 |
| 5,394,502 A * | 2/1995 | Caron | G02B 6/4473 | 174/72 A |
| 5,414,212 A * | 5/1995 | Clouet | H01B 7/0045 | 174/36 |
| 5,501,605 A * | 3/1996 | Ozaki | B60R 16/0207 | 174/72 A |
| 5,535,787 A * | 7/1996 | Howell | H02G 3/0487 | 138/110 |
| 5,615,293 A * | 3/1997 | Sayegh | G02B 6/4403 | 385/100 |
| 5,656,797 A * | 8/1997 | Lin | H01R 4/70 | 174/138 F |
| 5,676,563 A * | 10/1997 | Kondo | E04D 13/103 | 439/435 |
| 5,734,777 A * | 3/1998 | Merriken | G02B 6/445 | 385/135 |
| 5,755,596 A * | 5/1998 | Watson | H01R 13/025 | 174/267 |
| 5,796,041 A * | 8/1998 | Suzuki | H02G 15/18 | 174/92 |
| 5,892,177 A * | 4/1999 | Mazaris | H02G 3/26 | 174/135 |
| 5,911,450 A * | 6/1999 | Shibata | B60R 16/0207 | 174/112 |
| 5,957,505 A * | 9/1999 | Jarvenkyla | F16L 41/14 | 285/125.1 |
| 5,973,265 A * | 10/1999 | O'Brien | H01R 4/72 | 174/117 F |
| 6,010,342 A * | 1/2000 | Watson | H01R 13/025 | 174/267 |
| 6,011,399 A * | 1/2000 | Matsumaru | G01R 31/11 | 324/538 |
| 6,042,418 A * | 3/2000 | Cummings | A47G 33/08 | 439/505 |
| 6,066,799 A * | 5/2000 | Nugent | H01B 11/002 | 174/113 R |

(56) References Cited

U.S. PATENT DOCUMENTS

| | | | | |
|---|---|---|---|---|
| 6,083,015 | A * | 7/2000 | Vargas | B60R 16/0215 439/130 |
| 6,089,615 | A * | 7/2000 | Jappinen | F16L 41/14 285/125.1 |
| 6,107,573 | A * | 8/2000 | Uchiyama | H01R 4/22 174/75 R |
| 6,143,002 | A * | 11/2000 | Vietmeier | A61F 2/954 606/108 |
| 6,222,976 | B1 * | 4/2001 | Shahid | G02B 6/3608 385/114 |
| 6,330,746 | B1 * | 12/2001 | Uchiyama | G06F 30/15 29/872 |
| 6,394,849 | B2 * | 5/2002 | Kasai | H01R 9/2458 439/655 |
| 6,422,891 | B1 * | 7/2002 | Huang | F21V 23/06 362/249.01 |
| 6,439,923 | B1 * | 8/2002 | Kirkendall | H01R 27/02 439/502 |
| 6,466,725 | B2 * | 10/2002 | Battey | G02B 6/4473 385/100 |
| 6,503,098 | B2 * | 1/2003 | Aoki | B60R 16/0207 439/502 |
| 6,583,351 | B1 * | 6/2003 | Artman | H02G 15/34 174/15.5 |
| 6,610,929 | B1 * | 8/2003 | Motokawa | B60R 16/0207 174/135 |
| 6,619,697 | B2 * | 9/2003 | Griffioen | F16L 41/023 285/126.1 |
| 6,674,004 | B2 * | 1/2004 | Ito | B60R 16/0215 174/135 |
| 6,688,803 | B2 * | 2/2004 | Maria Van Giezen | F16B 7/044 403/347 |
| 6,763,166 | B2 * | 7/2004 | Yow, Jr. | G02B 6/4472 385/114 |
| 6,767,255 | B1 * | 7/2004 | Croswell | H01R 25/003 439/106 |
| 6,771,861 | B2 * | 8/2004 | Wagner | G02B 6/4472 385/100 |
| 6,960,722 | B2 * | 11/2005 | Frederick | B60R 16/0215 138/121 |
| 7,112,745 | B2 * | 9/2006 | Hatori | H01R 4/22 174/71 R |
| 7,155,093 | B2 * | 12/2006 | Elkins, II | G02B 6/4475 385/100 |
| 7,179,997 | B2 * | 2/2007 | Yamamoto | B60R 16/0215 174/71 R |
| 7,266,274 | B2 * | 9/2007 | Elkins, II | G02B 6/4473 385/100 |
| 7,277,614 | B2 * | 10/2007 | Cody | G02B 6/3807 385/100 |
| 7,575,476 | B2 | 8/2009 | Tyler et al. | |
| 7,624,503 | B2 * | 12/2009 | Fukuda | H01B 7/0045 174/72 A |
| 7,736,187 | B2 * | 6/2010 | Yaworski | H01H 85/0021 439/620.26 |
| 7,769,261 | B2 * | 8/2010 | Lu | G02B 6/4475 385/100 |
| 8,246,361 | B2 * | 8/2012 | Dennes | H01R 4/2433 439/107 |
| 8,481,868 | B2 * | 7/2013 | Dennes | H01R 4/2433 174/549 |
| 9,044,350 | B2 * | 6/2015 | Jenson | A61F 2/856 |
| 9,337,634 | B2 * | 5/2016 | Sato | H02G 3/0481 174/72 A |
| 9,373,943 | B1 * | 6/2016 | Tannenbaum | H02G 3/0437 |
| 9,437,349 | B2 * | 9/2016 | Saito | H01B 7/282 |
| 9,531,145 | B2 * | 12/2016 | Byrne | H01R 25/006 |
| 9,595,369 | B2 * | 3/2017 | Hamabayashi | H02G 3/0481 |
| 9,721,699 | B2 * | 8/2017 | Shiba | H02G 15/1806 |
| 9,752,763 | B2 * | 9/2017 | Lin | F21V 23/06 |
| 9,954,305 | B2 * | 4/2018 | Yu | H01R 13/514 |
| 10,189,422 | B2 * | 1/2019 | Adachi | B60R 16/0215 |
| 10,232,808 | B2 * | 3/2019 | Ogue | H01R 4/20 |
| 10,256,619 | B2 * | 4/2019 | Takahashi | H02G 15/1806 |
| 10,314,111 | B2 * | 6/2019 | Barfuss | B60N 2/5685 |
| 10,315,592 | B2 * | 6/2019 | Osada | H01B 9/003 |
| 10,431,352 | B2 * | 10/2019 | Fleischer | H01B 7/18 |
| 10,490,986 | B2 * | 11/2019 | Osada | H02G 3/0691 |
| 10,574,041 | B2 * | 2/2020 | Bier | H02G 15/113 |
| 10,605,936 | B2 * | 3/2020 | Drange | G01V 1/201 |
| 2002/0013081 | A1 * | 1/2002 | Shan | H01R 4/2416 439/395 |
| 2002/0023771 | A1 * | 2/2002 | Gerencir | H01R 4/186 174/88 R |
| 2002/0081083 | A1 * | 6/2002 | Griffioen | G02B 6/502 385/109 |
| 2004/0077191 | A1 * | 4/2004 | Murakoshi | H05K 7/026 439/76.2 |
| 2004/0154817 | A1 * | 8/2004 | Sudo | H02G 3/0468 174/481 |
| 2007/0031232 | A1 * | 2/2007 | Kurebayashi | B25J 19/0029 414/682 |
| 2008/0296037 | A1 * | 12/2008 | Burland | H02G 3/0487 174/36 |
| 2009/0034165 | A1 | 2/2009 | Tyler et al. | |
| 2009/0052122 | A1 * | 2/2009 | Johnson | H02G 3/00 361/643 |
| 2010/0090851 | A1 * | 4/2010 | Hauser | H01R 25/003 340/657 |
| 2010/0096184 | A1 * | 4/2010 | Ambo | B60R 16/0215 174/72 A |
| 2011/0081121 | A1 * | 4/2011 | Le Dissez | G02B 6/4475 385/102 |
| 2012/0051701 | A1 * | 3/2012 | Sicari | G02B 6/4463 385/100 |
| 2012/0076342 | A1 * | 3/2012 | Weber | D07B 1/16 381/384 |
| 2012/0247805 | A1 * | 10/2012 | Montena | H01R 4/646 174/78 |
| 2012/0261184 | A1 * | 10/2012 | Kitamura | H02G 3/0468 174/72 A |
| 2013/0032395 | A1 * | 2/2013 | Smoll | H01R 13/523 174/84 R |
| 2013/0068522 | A1 * | 3/2013 | Ogawa | B60R 16/0215 174/72 A |
| 2013/0292159 | A1 * | 11/2013 | Gotou | H02G 3/305 174/250 |
| 2014/0033524 | A1 * | 2/2014 | Sato | H01B 13/012 29/825 |
| 2014/0076628 | A1 * | 3/2014 | McGrath | H01B 7/0045 174/84 R |
| 2014/0238741 | A1 * | 8/2014 | Willing | H01R 4/186 174/84 R |
| 2015/0101837 | A1 * | 4/2015 | Evangelista | H02G 15/007 174/50 |
| 2015/0114711 | A1 * | 4/2015 | Dew | H02G 1/14 174/72 A |
| 2015/0229115 | A1 * | 8/2015 | George | H02G 15/188 307/31 |
| 2015/0279514 | A1 * | 10/2015 | Sato | B60R 16/0207 174/72 A |
| 2015/0280411 | A1 * | 10/2015 | Plathe | H02G 3/18 174/660 |
| 2015/0294768 | A1 * | 10/2015 | Sakaki | H01B 13/01209 174/68.3 |
| 2015/0329069 | A1 * | 11/2015 | Daugherty | B60R 16/0207 174/72 A |
| 2016/0036151 | A1 * | 2/2016 | Tominaga | B60R 16/0207 439/884 |
| 2016/0055938 | A1 * | 2/2016 | Hamabayashi | H01B 13/01263 174/72 A |
| 2016/0134089 | A1 * | 5/2016 | Peterson | F16L 3/23 174/72 A |
| 2016/0148720 | A1 | 5/2016 | Kanagawa | |
| 2016/0260523 | A1 * | 9/2016 | Aragiri | B60R 16/0215 |
| 2017/0243673 | A1 * | 8/2017 | Nakashima | C09D 151/08 |
| 2017/0246998 | A1 * | 8/2017 | Ogue | B60R 16/0215 |
| 2017/0274843 | A1 | 9/2017 | Adachi et al. | |

(56) References Cited

U.S. PATENT DOCUMENTS

| | | | |
|---|---|---|---|
| 2017/0313265 A1* | 11/2017 | Shimizu | B60R 16/023 |
| 2017/0330650 A1 | 11/2017 | Mizutani | |
| 2018/0029543 A1* | 2/2018 | Cho | H01B 7/0045 |
| 2018/0138676 A1* | 5/2018 | Yabashi | H02G 3/0406 |
| 2018/0174704 A1* | 6/2018 | Sugino | H01B 7/0045 |
| 2019/0223333 A1 | 7/2019 | Yokoyama et al. | |

FOREIGN PATENT DOCUMENTS

| | | | |
|---|---|---|---|
| JP | 2012-060177 A | | 3/2012 |
| JP | 2013045678 A | * | 3/2013 |
| JP | 2017-175686 A | | 9/2017 |
| WO | 2018/056460 A1 | | 3/2018 |

* cited by examiner

BRANCHING CIRCUIT BODY AND BRANCHING METHOD OF ELECTRIC WIRES

CROSS-REFERENCE TO RELATED APPLICATIONS

This application is based on and claims priority under 35 USC 119 from Japanese Patent Application No. 2018-072365 filed on Apr. 4, 2018, the contents of which are incorporated herein by reference.

TECHNICAL FIELD

The present invention relates to a branching circuit body and a branching method of electric wires.

BACKGROUND ART

There is known a technique which branches and connects a shielded electric wire by coupling a connector provided at an end portion of the shielded electric wire to a power distribution module having a housing that defines a shield interface (for example, see a Patent document 1).

PRIOR ART DOCUMENTS

Patent Documents

Patent document 1: JP-A-2009-38032

SUMMARY OF INVENTION

In the branching structure using the power distribution module described above, a power distribution module including a housing defining a shield interface, and a connector for connection to the power distribution module are required. Accordingly, the number of components of this branching structure is large, the cost increases, and the structure becomes complicated and large-scaled. In addition, in the branching structure using the power distribution module, since the number of branching circuits and branching locations are limited, it is difficult to cope with increase or decrease in the number of electric wires and a change in the branching locations, and the versatility is poor.

The present invention has been made in consideration of the above circumstances, and an object of the present invention is to provide a branching circuit body and a branching method of an electric wire, capable of easily branching an electric wire at low cost while securing a good shielding function, simplifying the structure, reducing the size, and improving versatility.

The object of the present invention described above is achieved by a branching circuit body having the following Configurations (1) to (5).

(1) A branching circuit body including:
a first electric wire,
a first shield tube covering the first electric wire,
a second electric wire electrically connected to the first electric wire and drawn out through an opening formed in the first shield tube,
a second shield tube covering the second electric wire and having an end portion inserted into the opening, and
a joining unit for joining the second shield tube to the first shield tube.

According to the branching circuit body of Configuration (1), it is possible to easily branch the second electric wire from the first electric wire without using a branching device such as a branching box, a power distribution module or a connector which is used in the related art. Furthermore, it is possible to easily join the second shield tube to the first shield tube without a gap by the joining unit, and securely shield the first electric wire and the second electric wire collectively by the first shield tube and the second shield tube. As a result, with the simplified structure, the cost can be reduced and assemblability can be improved, and the size can be also reduced. Further, a high degree of freedom of the branching location is provided, the number of electric wires can be easily increased and decreased, and high versatility can be obtained.

(2) The branching circuit body according to Configuration (1), including a mold part that covers a connection portion of the first electric wire and the second electric wire.

According to the branching circuit body of Constitution (2), since the connection portion of the first electric wire and the second electric wire is covered with the mold part, the connection portion can be securely protected and waterproofed.

(3) The branching circuit body according to Configuration (1) or (2), in which the joining unit includes a coupling member for coupling an end portion of the second shield tube inserted into the opening to join the end portion to the first shield tube.

According to the branching circuit body of Configuration (3), by coupling the end portion of the second shield tube inserted into the opening with the coupling member to join the end portion to the first shield tube, it is possible to easily and securely join the second shield tube to the first shield tube without a gap, thereby obtaining a good shielding effect.

(4) The branching circuit body according to Configuration (1) or (2), in which the joining unit includes a holding member which covers and holds the opening, into which the end portion of the second shield tube is inserted, and a periphery thereof.

According to the branching circuit body of Configuration (4), by covering and holding the opening, into which the end portion of the second shield tube is inserted, and the periphery thereof with the holding member, it is possible to hold the second shield tube and the first shield tube in a state where the second shield tube is easily and securely joined to the first shield tube without a gap and to obtain good shielding effect.

(5) The branching circuit body according to Configuration (1) or (2), in which the joining unit is a welding unit for welding an edge of the opening and a periphery of the second shield tube.

According to the branching circuit body of Configuration (5), the edge of the opening and the periphery of the second shield tube are joined by a welding unit for pressure welding such as ultrasonic bonding, and welding, brazing, or the like. As a result, the second shield tube can be more easily and securely joined to the first shield tube without a gap, and a good shielding effect can be obtained.

Further, the object of the present invention described above is achieved by a branching method of an electric wire having the following Configurations (6) to (8).

(6) A branching method of an electric wire, which branches a second electric wire from a first electric wire and collectively shields the first electric wire and the second electric wire, the method including,
a wire connecting process of electrically connecting the first electric wire and the second electric wire, a first shielding process of passing the first electric wire and the second electric wire through a first shield tube, a drawing-out process of forming an opening in the vicinity of the connection portion of the first electric wire and the second electric wire in the first shield tube and drawing out the second electric wire through the opening, a second shielding process of passing the second electric wire through a second shield tube, and a shield tube joining process of inserting and joining an end portion of the second shield tube into the opening.

According to the branching method of Configuration (6), it is possible to easily branch the second electric wire from the first electric wire without using a branching device such as a branching box, a power distribution module or a connector. Furthermore, it is possible to join the second shield tube to the first shield tube without a gap, and securely shield the first electric wire and the second electric wire collectively with the first shield tube and the second shield tube. As a result, with the simplified structure, the cost can be reduced and assembly work can be improved, and the size can be also reduced. Further, a high degree of freedom of the branching location is provided, the number of electric wires can be easily increased and decreased, and high versatility can be obtained.

(7) The method according to Configuration (6), including a molding process of forming a mold part for covering the connection portion of the first electric wire and the second electric wire connected to each other in the electric wire connecting process.

According to the branching method of a wire of Constitution (7), since the connection portion of the first electric wire and the second electric wire is covered with the mold part, the connection portion can be securely protected and waterproofed.

(8) A branching method of an electric wire, which branches a second electric wire from a first electric wire and collectively shields the first electric wire and the second electric wire, the branching method including, a first shielding process of passing the first electric wire through a first shield tube, a wire connecting process of forming an opening in the vicinity of a branching portion at which the second electric wire is branched from the first electric wire in the first shield tube, and electrically connecting a terminal of the second electric wire inserted through the opening to the first electric wire, a second shielding process of passing the second electric wire through a second shield tube, and a shield tube joining process of inserting and joining an end portion of the second shield tube into the opening.

According to the branching method of Configuration (8), it is possible to easily branch the second electric wire from the first electric wire without using a branching device such as a branching box, a power distribution module or a connector. Furthermore, it is possible to join the second shield tube to the first shield tube without a gap, and securely shield the first electric wire and the second electric wire collectively with the first shield tube and the second shield tube. As a result, with the simplified structure, the cost can be reduced and assembly work can be improved, and the size can be also reduced. Further, a high degree of freedom of the branching location is provided, and high versatility can be obtained.

According to the present invention, a branching circuit body and a branching method of an electric wire, capable of easily branching an electric wire at low cost while securing a good shielding function, simplifying the structure, reducing the size, and improving versatility, can be provided.

The present invention has been briefly described above. Furthermore, the details of the present invention will be further clarified by reading the aspects (hereinafter referred to as "embodiment") for carrying out the invention described below with reference to the accompanying drawings.

BRIEF DESCRIPTION OF DRAWINGS

FIG. 4A is a plan view of the first electric wire and the second electric wire with conductors thereof being exposed, FIG. 4B is a plan view of the first electric wire and the second electric wire with the conductors thereof being joined to each other, and FIG. 4C is a perspective view of the connection portion of the first electric wire and the second electric wire covered with a mold part;

FIG. 5A is a perspective view of branching portions of the first electric wires and the second electric wires, in which mold parts are overlapped and combined with each other, FIG. 5B is a perspective view of the branching portions of the first electric wires and the second electric wires covered with a first shield tube, and FIG. 5C is a perspective view of the branching portions of the first electric wires and the second electric wires, in which openings are formed in the first shield tube;

FIG. 6A is a perspective view of the branching portions of the first electric wires and the second electric wires in a state where the second electric wires are drawn out through the openings of the first shield tube, and FIG. 6B is a perspective view of the branching portions of the first electric wires and the second electric wires in a state where second shield tubes are provided around the second electric wires;

FIG. 7A is a perspective view of the branching portions of the first electric wires and the second electric wires in a state where end portions of the second shield tubes are inserted through the openings of the first shield tube, and FIG. 7B is a perspective view of the branching portions of the first electric wires and the second electric wires in a state of being coupled with coupling bands;

FIG. 12A is a perspective view of a first electric wire covered with a first shield tube, FIG. 12B is a perspective view of the first electric wire in which an opening is formed in the first shield tube, and FIG. 12C is a perspective view of a state where the first electric wire and a second electric wire with the conductors thereof being exposed;

FIG. 13A is a perspective view of a connection portion of the first electric wire and the second electric wire, at which a terminal of the second electric wire inserted through the opening of the first shield tube is joined to a conductor of the first electric wire, FIG. 13B is a perspective view of the branching portion of the first electric wire and the second electric wire covered with insulating tape, and FIG. 13C is a perspective view of the branching portion of the first electric wire and the second electric wire in a state where the second shield tube is loaded around the second electric wire; FIG. 14A is a perspective view of the branching portion of the first electric wire and the second electric wire in a state where an end portion of the second shield tube is inserted through the opening of the first shield tube, and FIG. 14B is a perspective view of the branching portion of the first electric wire and the second electric wire in the state of being coupled with a coupling band.

DESCRIPTION OF EMBODIMENTS

Hereinafter, an embodiment of the present invention will be described with reference to the drawings.

Figure 1:
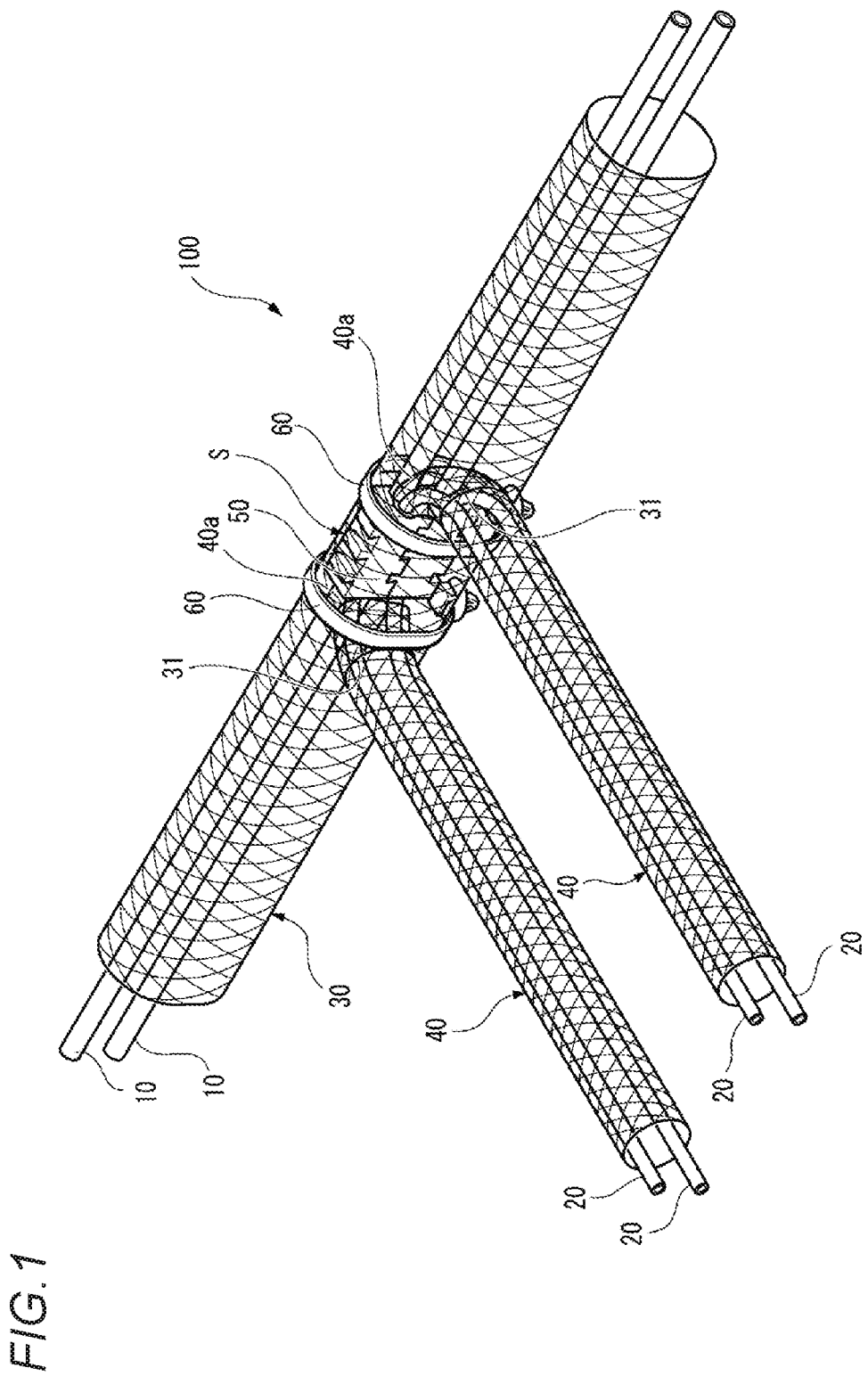
FIG. 1 is a perspective view of a branching circuit body according to a first embodiment of the present invention.
Figure 2:
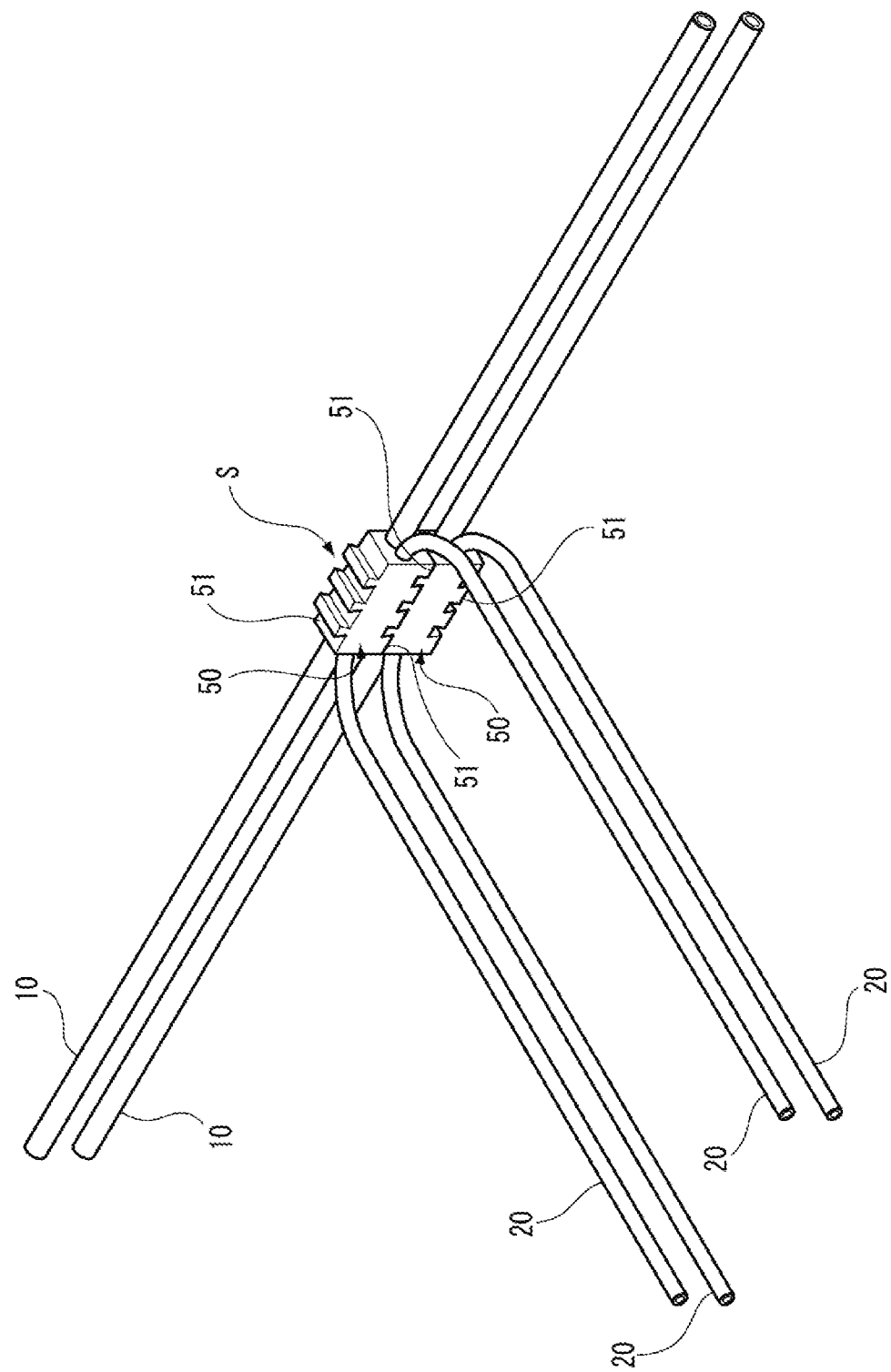
FIG. 2 is a perspective view of the branching circuit body illustrated in FIG. 1, from which shield tubes are removed.
Figure 3:
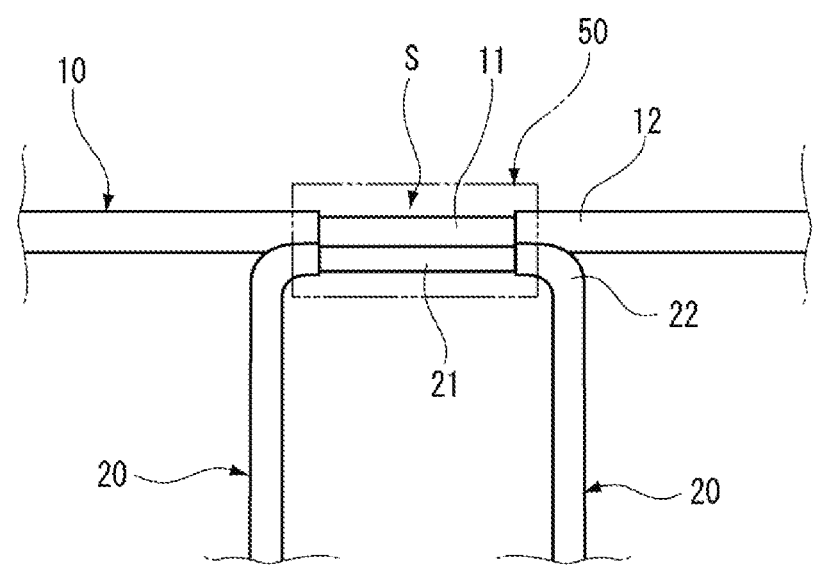
FIG. 3 is a plan view of a connection portion of first electric wires and second electric wires.

FIG. 1 is a perspective view of a branching circuit body 100 according to a first embodiment of the present invention. FIG. 2 is a perspective view of the branching circuit body 100 illustrated in FIG. 1, from which a first shield tube 30 and second shield tubes 40 are removed. FIG. 3 is a plan view of a connection portion of first electric wires 10 and second electric wires 20.

As illustrated in FIG. 1, the branching circuit body 100 according to the first embodiment includes the first electric wire 10, the second electric wire 20, the first shield tube 30, and the second shield tube 40. The branching circuit body 100 is a circuit body having a shield function. The first electric wire 10 is a main wire, and the first shield tube 30 is a shield tube for the main wire, which covers and shields the periphery of the first electric wire 10. The second electric wire 20 is a branching line branched from the first electric wire 10 that is the main wire, and the second shield tube 40 is a shield tube for the branching wire, which covers and shields the periphery of the second electric wire 20. In the branching circuit body 100, for example, in order to supply electric power from a power source such as a battery or the like to various electric components, the first electric wire 10 is connected to the power source or the like, and the second electric wire 20 is connected to various electrical components or the like.

As illustrated in FIG. 2, a plurality of first electric wires 10 (two wires in this example) are provided and wired in parallel with each other. A plurality of second electric wires 20 (two wires, respectively, in this example) are drawn out from each of first electric wires 10. Each of the second electric wires 20 extends in the same direction orthogonal to the first electric wire 10.

A branching portion S of the second electric wire 20 at each first electric wire 10 is covered with a mold part 50 formed of an insulating resin and is waterproofed. The mold part 50 has a connecting surface 51 whose upper and lower surfaces are uneven. The upper and lower mold parts 50 are positioned in a longitudinal direction and engaged as the uneven portions of the connecting surfaces 51 are mated with each other.

As illustrated in FIG. 3, the first electric wire 10 is an insulated wire in which the outer periphery of a conductor 11 including a stranded wire formed by twisting strands of copper or copper alloy and aluminum or aluminum alloy, or a single wire is covered with an outer sheath 12 formed of an insulating resin. The second electric wire 20 is an insulated wire in which the outer periphery of a conductor 21 including a stranded wire formed by twisting strands of copper or copper alloy and aluminum or aluminum alloy, or a single wire is covered with an outer sheath 22 formed of an insulating resin. At the branching part S, conductors 11 and 21 of the first electric wire 10 and the second electric wire 20 are exposed by removing a part of the outer sheaths 12 and 22 of the first electric wire 10 and the second electric wire 20 and the exposed conductors 11 and 21 are joined to be electrically connected to each other. These conductors 11 and 21 are joined to each other by ultrasonic joining or a bonder, for example.

As illustrated in FIG. 1, the first shield tube 30 is formed in a cylindrical shape. The first electric wires 10 are inserted into the first shield tube 30. As a result, the outer circumferences of the first electric wires 10 are collectively covered by the first shield tube 30. The second shield tube 40 is formed in a cylindrical shape. The second electric wires 20 are inserted into the second shield tube 40. As a result, the outer circumferences of the second electric wires 20 are collectively covered by the second shield tube 40.

Each of the first shield tube 30 and the second shield tube 40 is formed by knitting strands of a conductive metal material such as copper or a copper alloy into a tube shape and has flexibility.

The first shield tube 30 has two openings 31 in the vicinity of the branching portion S which is a connection portion of the first electric wire 10 and the second electric wire 20, and the second electric wire 20 is drawn out through these openings 31. In addition, an end portion 40a of the second shield tube 40 is inserted into the opening 31. The end portion 40a of the second shield tube 40 inserted into the opening 31 is bent toward the branching portion S along the second electric wire 20.

A coupling band (coupling member) 60 is wound around the first shield tube 30. The coupling band 60 is wound between the opening 31 and the branching portion S. As a result, the second shield tube 40 inserted into the opening 31 and bent toward the branching portion S side is coupled together and joined to the first shield tube 30, the first electric wire 10, and the second electric wire 20 with the coupling band 60. Therefore, the second shield tube 40 is joined to the first shield tube 30 without a gap.

Next, an electric wire branching method for branching electric wires to obtain the branching circuit body 100 will be described.

Figure 4A:
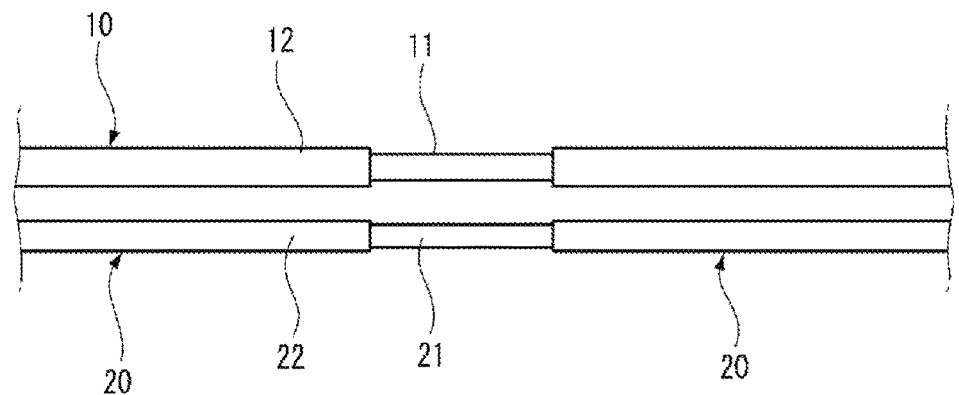
FIGS. 4A to 4C are diagrams for explaining a branching method of an electric wire according to the first embodiment.
Figure 4B:
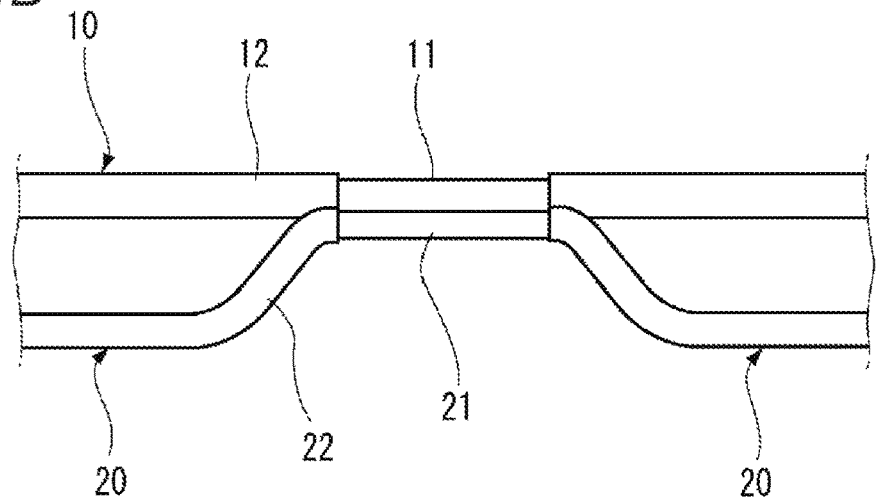
Figure 4C:
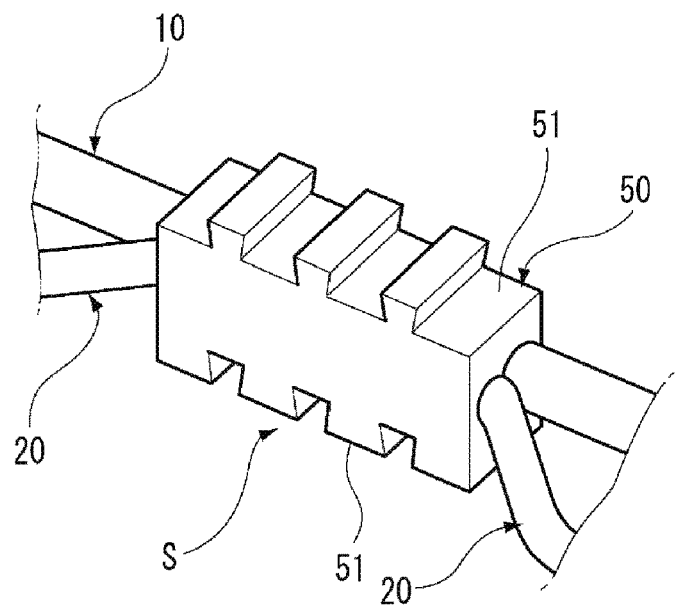
Figure 5A:
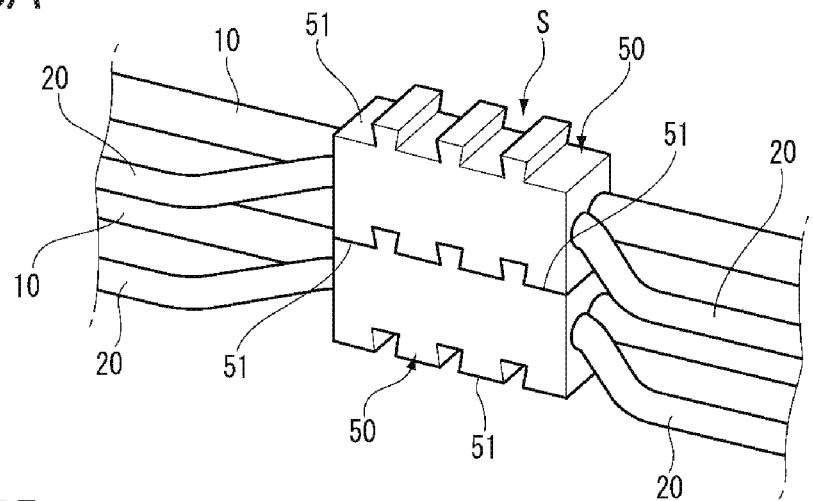
FIGS. 5A to 5C are diagrams for explaining the branching method of electric wires according to the first embodiment.
Figure 5B:
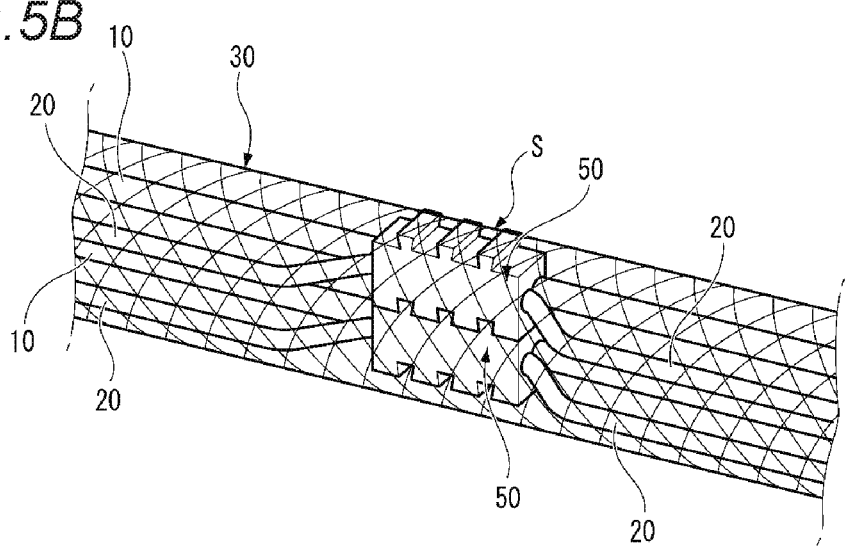
Figure 5C:
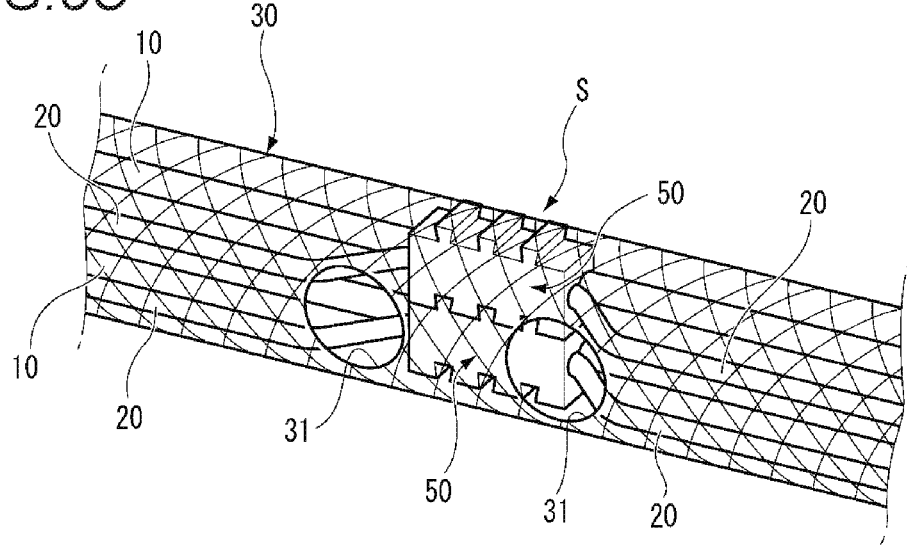
Figure 6A:
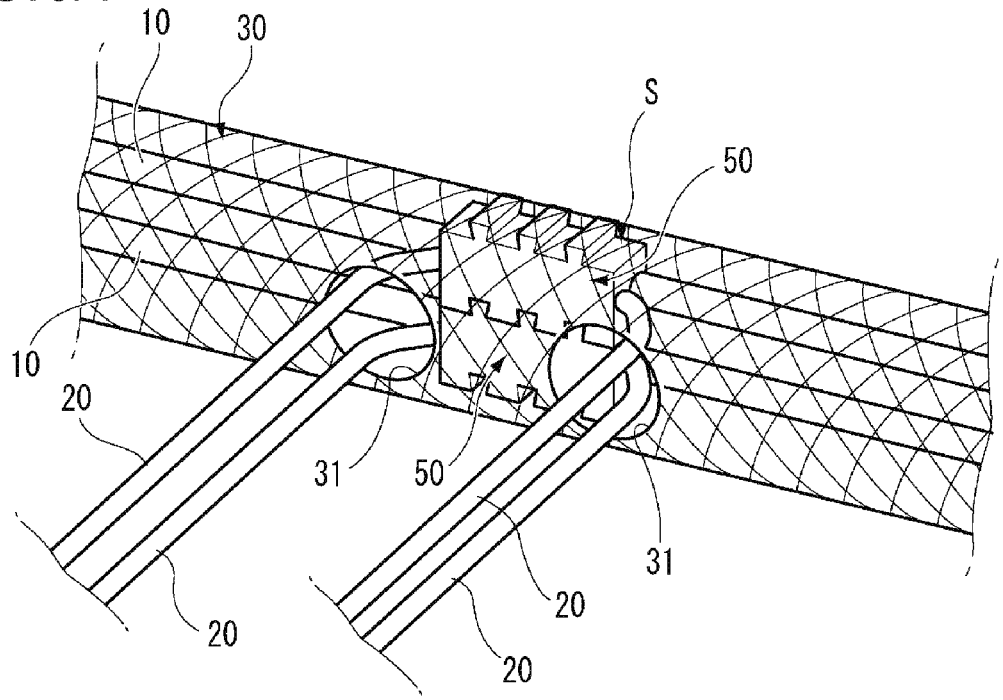
FIGS. 6A and 6B are diagrams for explaining the branching method of electric wires according to the first embodiment.
Figure 6B:
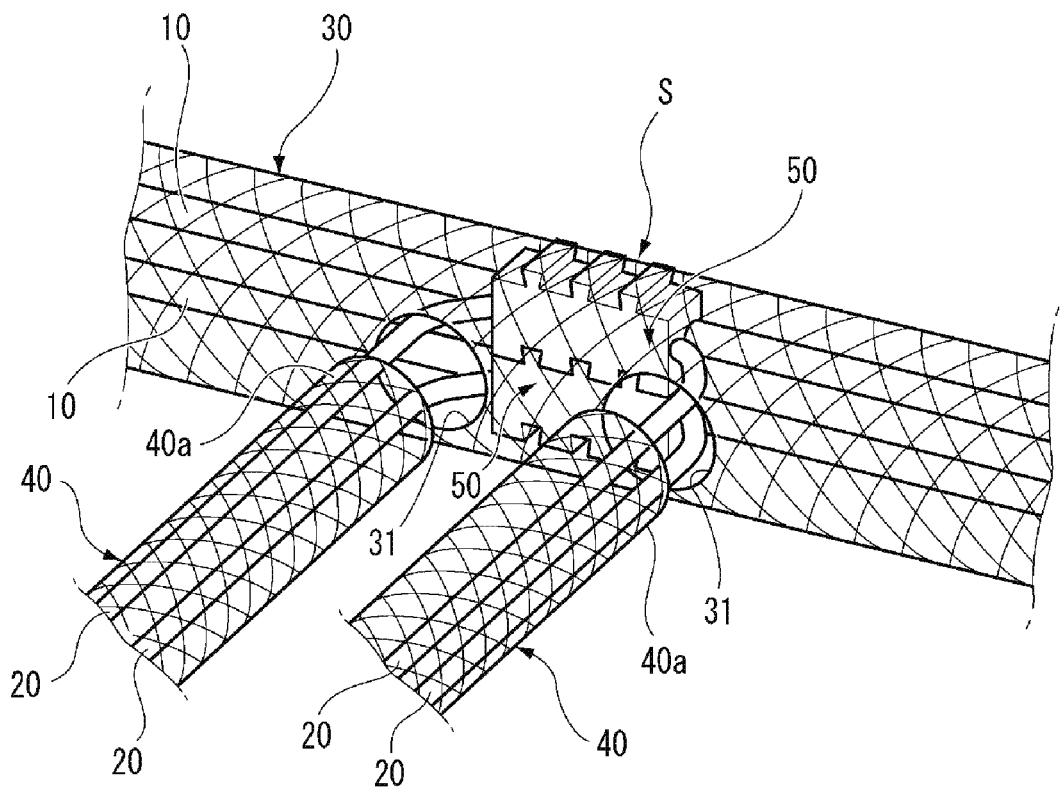
Figure 7A:
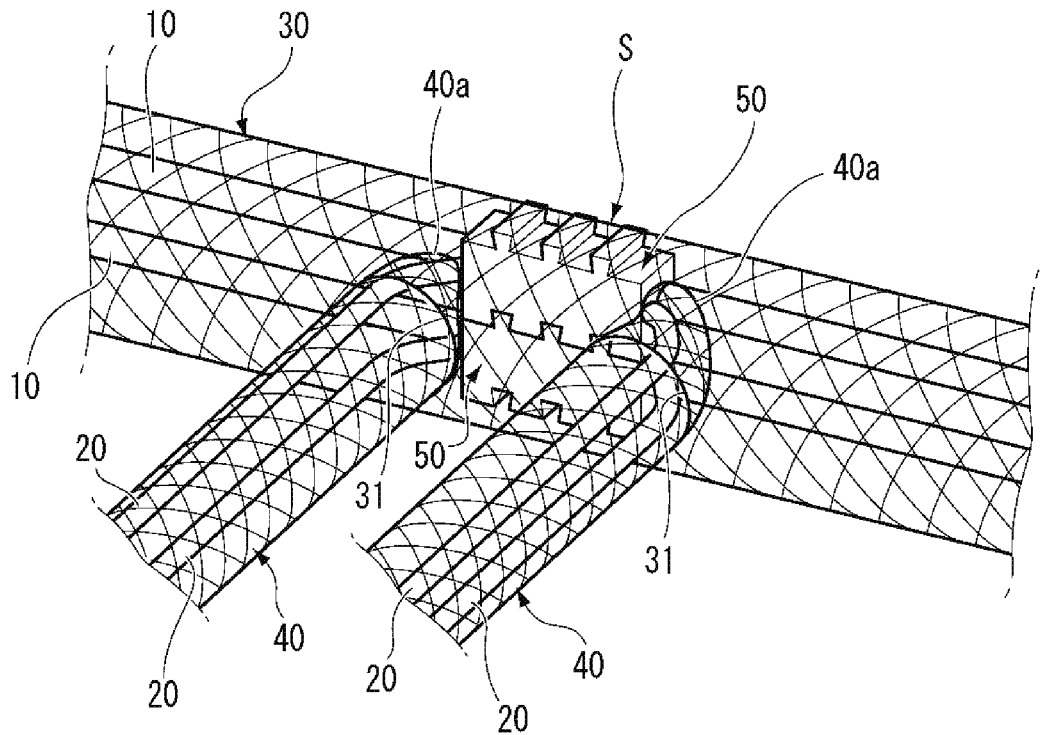
FIGS. 7A and 7B are diagrams for explaining the branching method of electric wires according to the first embodiment.
Figure 7B:
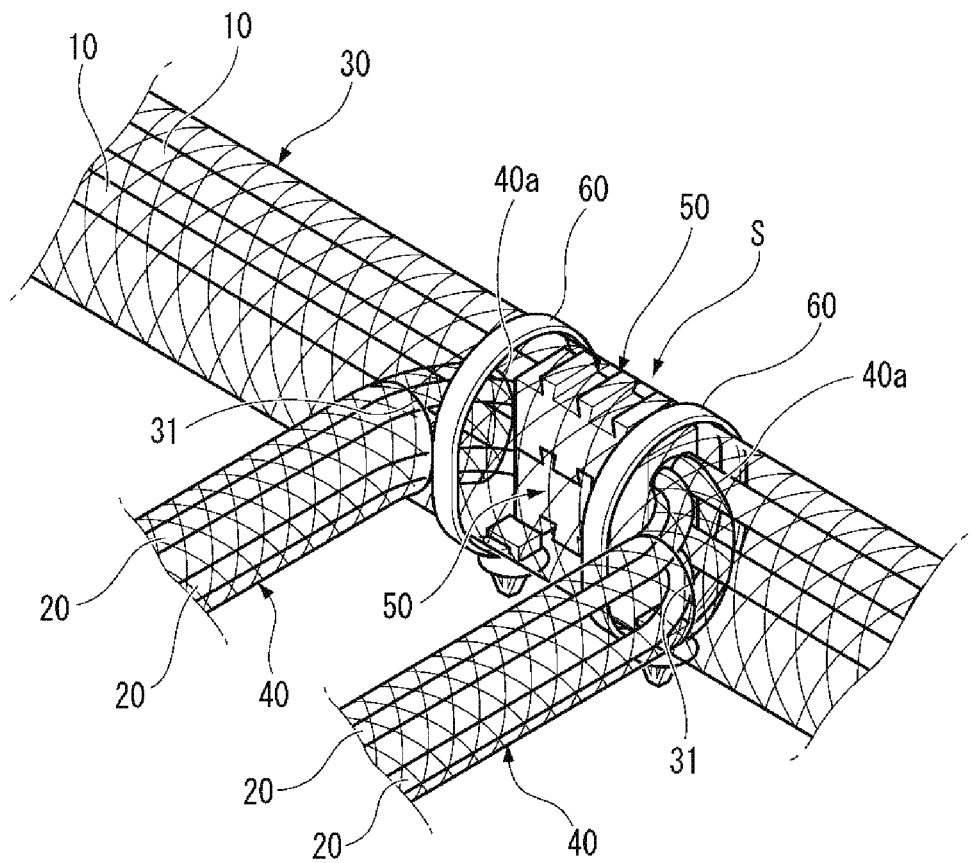

FIG. 4A is a plan view of the first electric wire 10 and the second electric wire 20 with conductors 11 and 21 thereof being exposed, FIG. 4B is a plan view of the first electric wire 10 and the second electric wire 20 with the conductors thereof being joined to each other, and FIG. 4C is a perspective view of the connection portion of the first electric wire 10 and the second electric wire 20 covered with the mold part 50. FIG. 5A is a perspective view of the branching portions S of the first electric wires 10 and the second electric wires 20 in which the mold parts 50 are overlapped to be combined with each other, FIG. 5B is a perspective view of the branching portions S of the first electric wires 10 and the second electric wires 20 covered with the first shield tube 30, and FIG. 5C is a perspective view of the branching portions S of the first electric wires 10 and the second electric wires 20 in which the openings 31 are formed in the first shield tube 30. FIG. 6A is a perspective view of the branching portions S of the first electric wires 10 and the second electric wires 20 in a state where the second electric wires 20 are drawn out through the openings 31, and FIG. 6B is a perspective view of the branching portions S of the first electric wires 10 and the second electric wires 20 in a state where the second shield tubes 40 are provided on the second electric wires 20. FIG. 7A is a perspective view of the branching portions S of the first electric wires 10 and the second electric wires 20 in a state where end portions 40a of the second shield tubes 40 are inserted into the openings 31, and FIG. 7B is a perspective view of the branching portions S of the first electric wires 10 and the second electric wires 20 in a state of being coupled with coupling bands 60.

(Wire Connection Process)

As illustrated in FIG. 4A, portions of the outer sheaths 12 and 22 of the first electric wire 10 and the second electric wire 20 are removed, thereby exposing the conductors 11 and 21. Next, as illustrated in FIG. 4B, the exposed conductors 11 and 21 of the first electric wire 10 and the second electric wire 20 are joined to each other, and the first electric wire 10 and the second electric wire 20 are electrically connected to each other.

(Molding Process)

As illustrated in FIG. 4C, the mold part 50 is formed with an insulating resin to cover the connection portion of the conductors 11 and 21 of the first electric wire 10 and the second electric wire 20. As a result, the connection portion of the conductors 11 and 21 of the first electric wire 10 and the second electric wire 20 is covered with the mold part 50 to form the branching portion S that is protected and waterproofed.

(First Shielding Process)

As illustrated in FIG. 5A, the mold part 50 is overlapped and connected such that the first electric wire 10 and the second electric wire 20 are coupled. In this state, as illustrated in FIG. 5B, the first electric wire 10 and the second electric wire 20 are penetrated through the first shield tube 30. As a result, the periphery of the first electric wire 10 and the second electric wire 20 including the branching portion S are covered with the first shield tube 30.

(Drawing-out Process)

As illustrated in FIG. 5C, the openings 31 are formed in the vicinity of the branching portion S in the first shield tube 30. Next, as illustrated in FIG. 6A, the second electric wires 20 passed through the first shield tube 30 are drawn out through the openings 31 of the first shield tube 30.

(Second Shielding Process)

As illustrated in FIG. 6B, the second electric wires 20 drawn out through the openings 31 of the first shield tube 30 are passed through the second shield tube 40. As a result, the periphery of the second electric wires 20 is covered with the second shield tube 40.

(Shield Tube Joining Process)

As illustrated in FIG. 7A, the end portion 40a of the second shield tube 40, with the second electric wires 20 being passed therethrough, is inserted through the opening 31 into the first shield tube 30 and bent toward the branching portion S side along the second electric wires 20. Next, as illustrated in FIG. 7B, a coupling band 60 is wound between the opening 31 and the branching portion S in the first shield tube 30, such that the end portion 40a of the second shield tube 40 is coupled to the first electric wires 10 and the second electric wires 20 with the coupling band 60. Therefore, the second shield tube 40 is joined to the first shield tube 30 without a gap.

Here, a reference example will be described.

Figure 8:
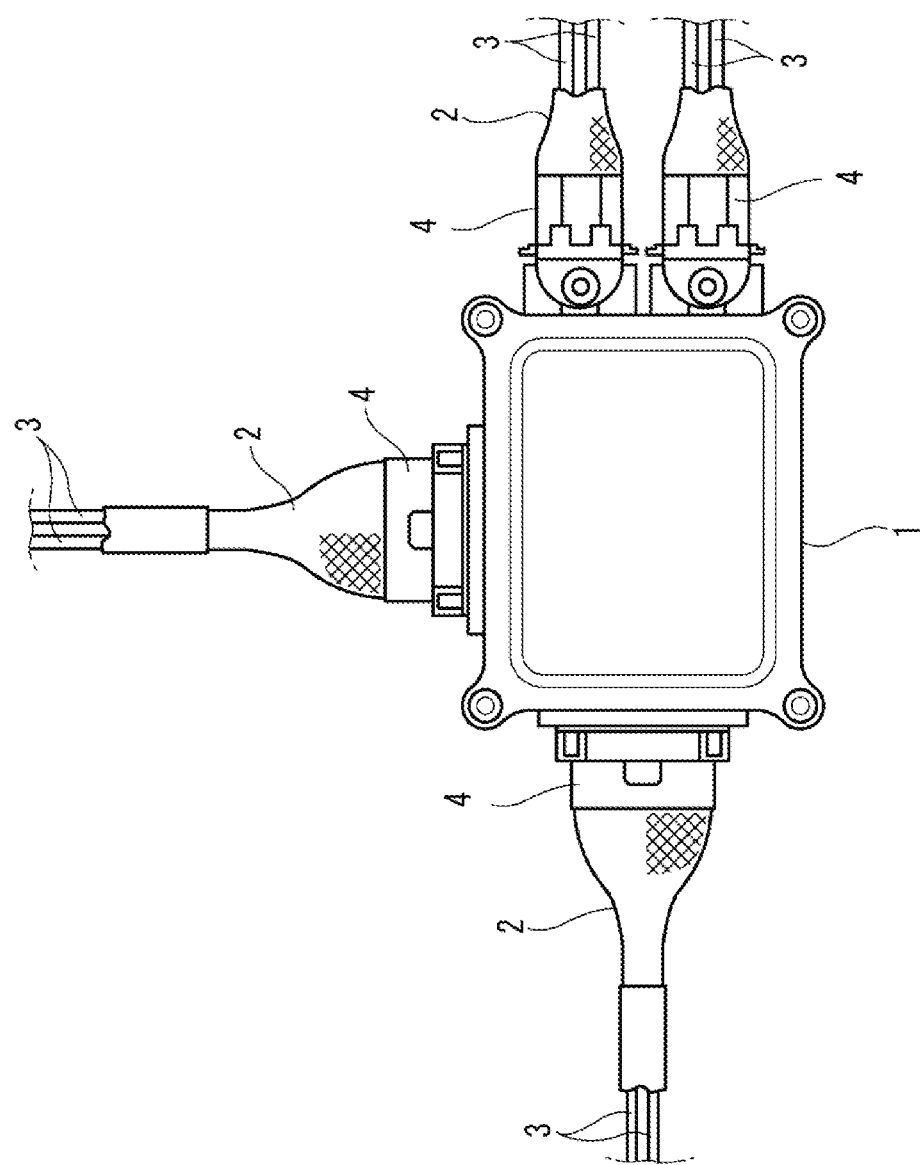
FIG. 8 is a diagram for explaining a reference example, and is a plan view of a branching box to which electric wires are connected.

FIG. 8 is a diagram for explaining a reference example, and is a plan view of a branching box 1 to which electric wires are connected.

In the reference example illustrated in FIG. 8, the electric wire 3 is branched using the branching box 1. The branching box 1 is configured with a conductive metal shield case and accommodates a bus bar therein. In the branching box 1, a plurality of electric wires 3 covered with a braided shield tube 2 on the periphery thereof are connected by a connector 4, and each shield tube 2 is connected to the branching box 1. In the branching box 1, predetermined electric wires 3 are electrically connected to each other by the bus bar in the branching box 1.

In the structure according to this reference example, since the branching box 1 accommodating the bus bars, and the connector 4 are used, many components are required and the cost is increased. In addition, it results in a complicated structure and an increase in the size thereof, and complicated assembly work is required. Moreover, in the structure according to the reference example, since the number of branching circuits and branching locations are limited, there is a problem that it is difficult to cope with increase or decrease in the number of electric wires 3 and a change in the branching locations, and that the versatility is poor.

On the other hand, according to the branching circuit body 100 and the branching method of the electric wire according to the first embodiment described above, it is possible to easily branch the second electric wire 20 from the first electric wire 10 without using a branching device such as a branching box, a power distribution module, or a connector which is used in the reference example. As a result, with the simplified structure, the cost can be reduced and assembly work can be improved, and the size can be also reduced. Further, a high degree of freedom of the branching location is provided, the number of electric wires can be easily increased and decreased, and high versatility can be obtained. Furthermore, it is possible to easily and securely join the second shield tube 40 to the first shield tube 30 by coupling the end portion 40a of the second shield tube 40 inserted into the opening 31 with the coupling band 60 to join to the first shield tube 30. Accordingly, the first electric wire 10 and the second electric wire 20 can be shielded collectively and securely by the first shield tube 30 and the second shield tube 40, and a good shielding effect can be obtained.

In addition, since the connection portion of the first electric wire 10 and the second electric wire 20 is covered with the mold part 50, it is possible to securely protect and waterproof the connection portion.

While the second shield tube 40 is coupled and joined to the first shield tube 30 by the coupling band 60 in the first embodiment described above, the second shield tube 40 may be coupled and joined to the first shield tube 30 by winding a coupling member formed with insulating tape instead of the coupling band 60.

Further, in the first embodiment described above, there are two openings 31 provided in the first shield tube 30 such that both end portions of the second electric wire 20 connected to each first electric wire 10 are drawn out from the openings 31, respectively, thereby forming two branching lines. Alternatively, it is also possible that one opening 31 is provided in the first shield tube 30, the second electric wire 20 whose end portion is connected to first electric wire 10 is drawn out through the opening 31 to form one branching line.

Next, respective modifications will be described.

Modification 1

Figure 9A:
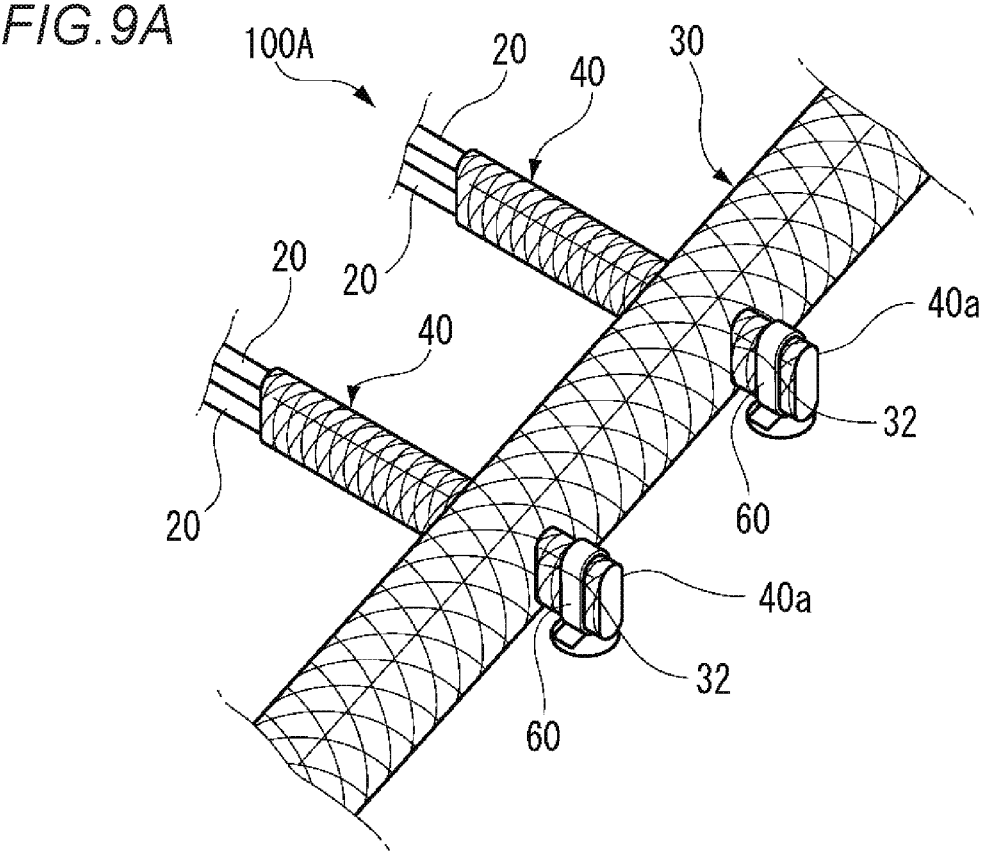
FIGS. 9A and 9B are perspective views of a branching portion of a branching circuit body according to Modification 1 of the present invention, respectively.
Figure 9B:
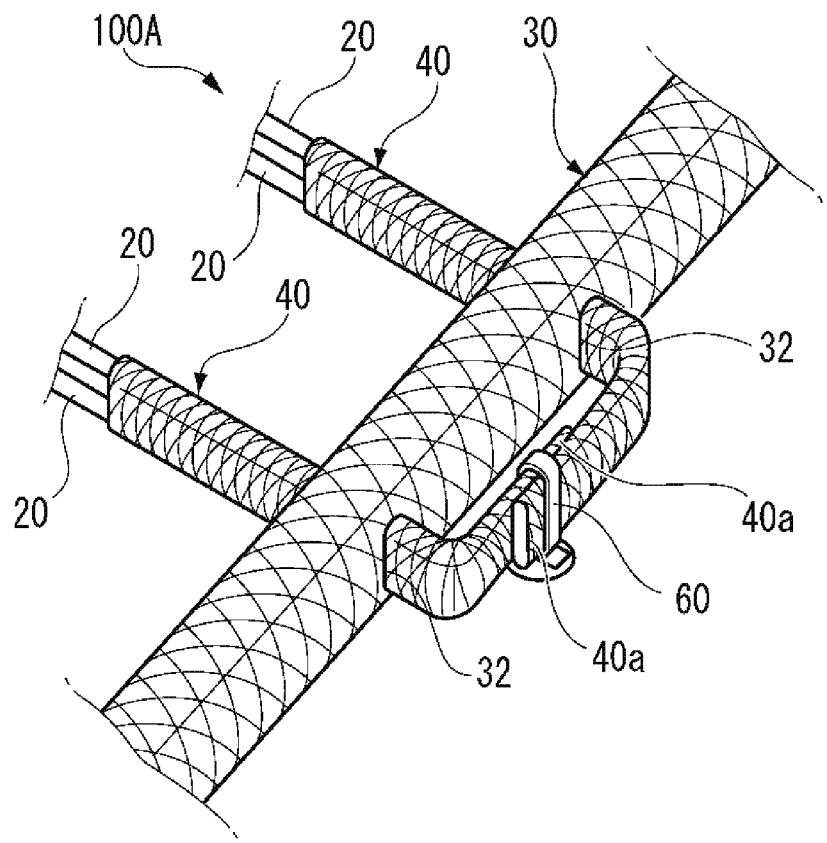

FIGS. 9A and 9B are perspective views of a branching portion of a branching circuit body 100A according to Modification 1, respectively.

As illustrated in FIG. 9A, in Modification 1, the end portions 40a of the second shield tubes 40 inserted into the openings 31 of the first shield tube 30 is drawn out through openings 32 on the opposite side to the opening 31. The coupling band 60 is wound around the end portions 40a of the second shield tubes 40 drawn out through openings 32 to be latched by and joined to the first shield tube 30. When coupling the end portions 40a of the second shield tubes 40 with the coupling bands 60, it is preferable that a part of the first shield tube 30 is coupled together.

According to this Modification 1, the second shield tube 40 is joined to the first shield tube 30 by coupling with the coupling band 60 and thus, the second shield tube 40 can be joined to the first shield tube 30 without a gap, and a good shielding effect can be obtained.

In Modification 1, as illustrated in FIG. 9B, the end portions 40a of the second shield tubes 40 drawn out through the openings 32 of the first shield tube 30 may intersect each other, and the intersection portion may be coupled with the coupling band 60. In this manner, the end portions 40a of the second shield tubes 40 are coupled to each other, and thus, the second shield tubes 40 can be surely prevented from slipping out from the first shield tube 30.

Modification 2

Figure 10A:
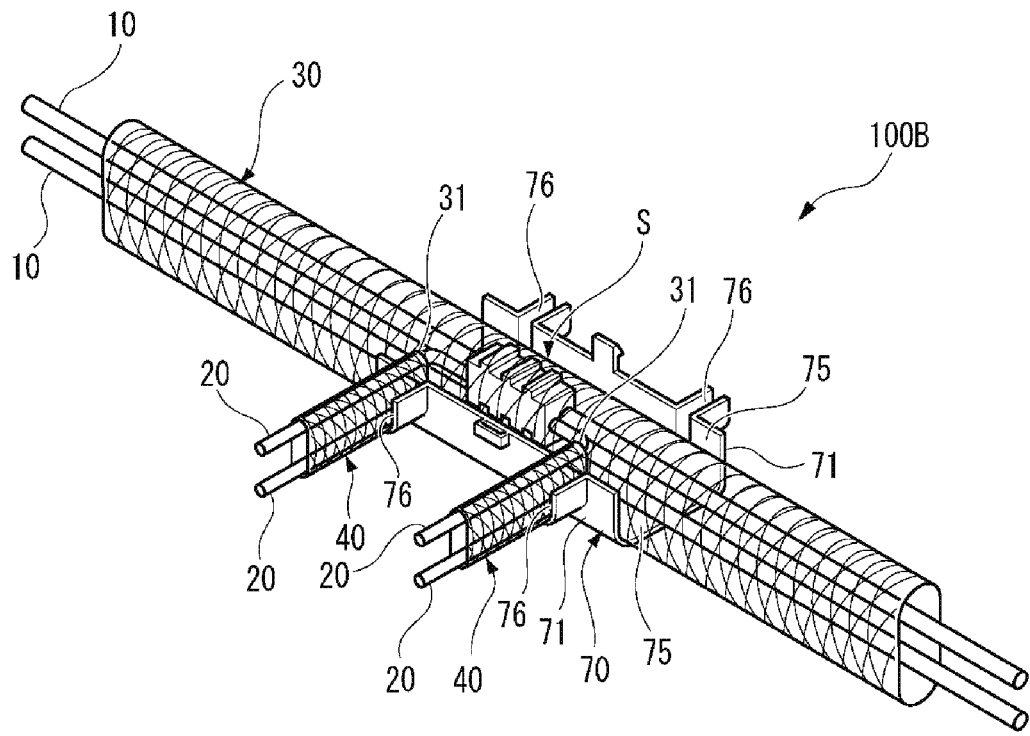
FIGS. 10A and 10B are perspective views of a branching portion of a branching circuit body according to Modification 2 of the present invention, respectively.
Figure 10B:
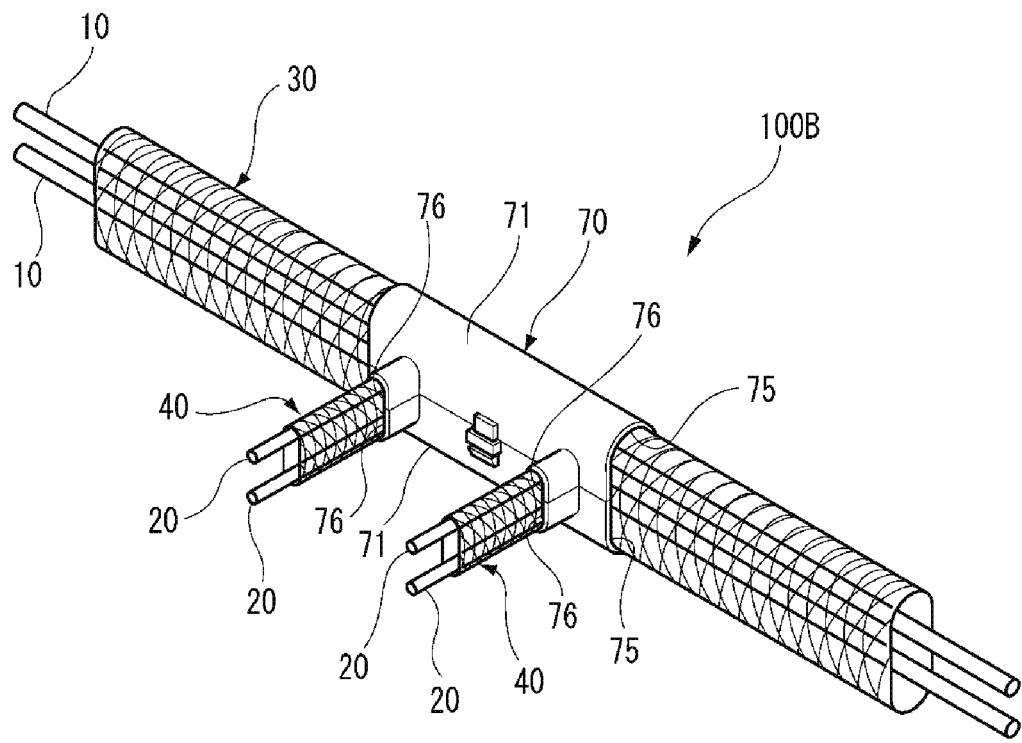

FIGS. 10A and 10B are perspective views of a branching portion S of a branching circuit body 100B according to Modification 2, respectively.

As illustrated in FIGS. 10A and 10B, in Modification 2, the second shield tubes 40 are joined to the first shield tube 30 by using a holder (holding member) 70 covering the periphery of the branching portion S. The holder 70 is formed from an electrically insulating resin, and has a structure in which a pair of divided holders 71, which are halved vertically, are pivotably connected to each other by a hinge portion (not illustrated). The divided holder 71 includes a main wire recessed portion 75 into which the first shield tube 30 is fitted and a branching wire recessed portion 76 into which the second shield tube 40 is fitted.

In order to mount the holder 70, first, the first shield tube 30 is fitted into the main wire recessed portion 75 of one divided holder 71 and the second shield tube 40 is fitted into the branching wire recessed portion 76 (see FIG. 10A). Then, the other divided holder 71 is pivoted and covered on one divided holder 71. In this way, the first shield tube 30 is fitted into each main wire recessed portion 75 of the divided holder 71, and the second shield tube 40 is fitted into the branching wire recessed portion 76 of the divided holder 71 (see FIG. 10B). As a result, the first shield tube 30 and the second shield tube 40 are covered and held at the branching portion S, and the second shield tube 40 is maintained in a state of being joined to the first shield tube 30.

According to Modification 2, since the second shield tube 40 is held by the holder 70, the second shield tube 40 can be easily joined to the first shield tube 30, and a good shielding effect can be obtained.

Modification 3

Figure 11:
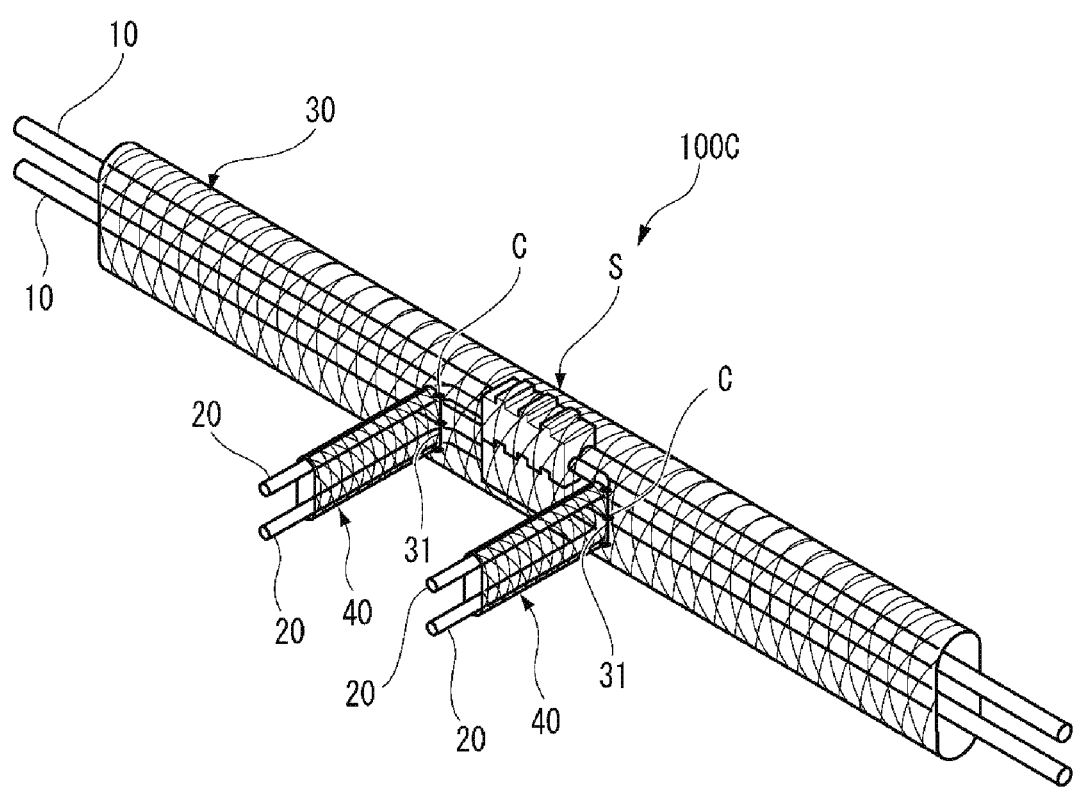
FIG. 11 is a perspective view of a branching portion of a branching circuit body according to Modification 3 of the present invention.

FIG. 11 is a perspective view of the branching portion S of a branching circuit body 100C according to Modification 3.

As illustrated in FIG. 11, in Modification 3, an edge of the opening 31 of the first shield tube 30 and the periphery of the second shield tube 40 inserted into the opening 31 are joined by a welding unit. As a way of joining by the welding unit, there are, for example, pressure weldings such as ultrasonic joining, welding, brazing, and the like. Further, the edge of the opening 31 of the first shield tube 30 and the periphery of the second shield tube 40 can be joined by a mechanical coupling unit using a stapler or the like.

According to Modification 3, the second shield tube 40 is joined at a welded portion C. Therefore, the second shield tube 40 can be easily joined to the first shield tube 30 without a gap, and a good shielding effect can be obtained.

Next, an electric wire branching method for branching electric wires to obtain a branching circuit body 200 according to a second embodiment of the present invention will be described.

Figure 12A:
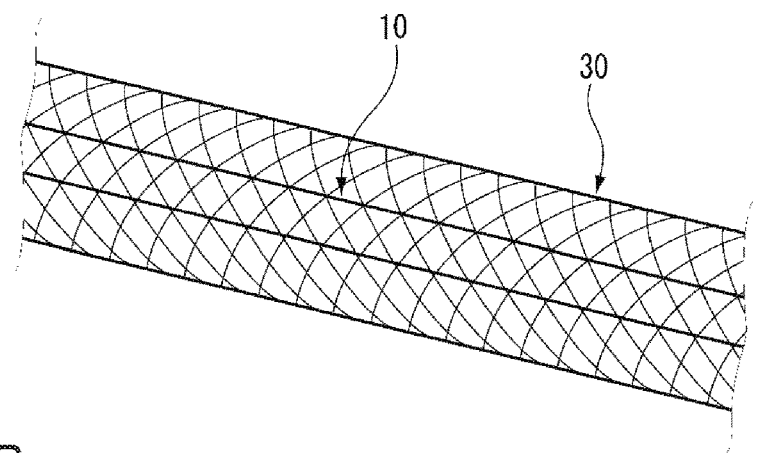
FIGS. 12A to 12C are diagrams for explaining a branching method of an electric wire according to a second embodiment of the present invention.
Figure 12B:
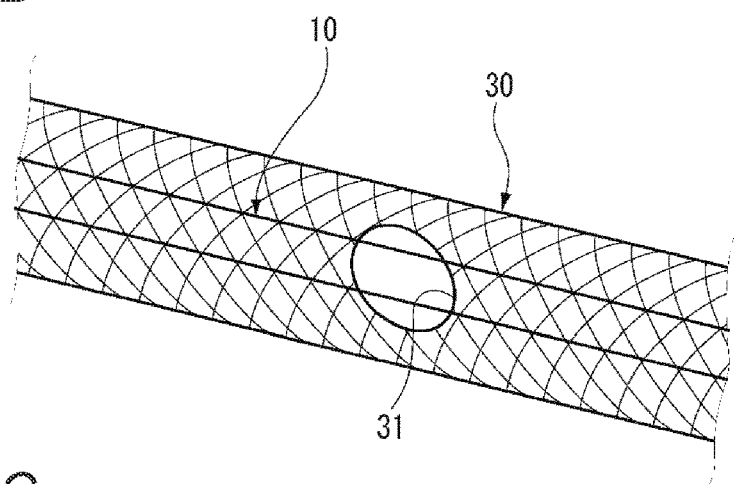
Figure 12C:
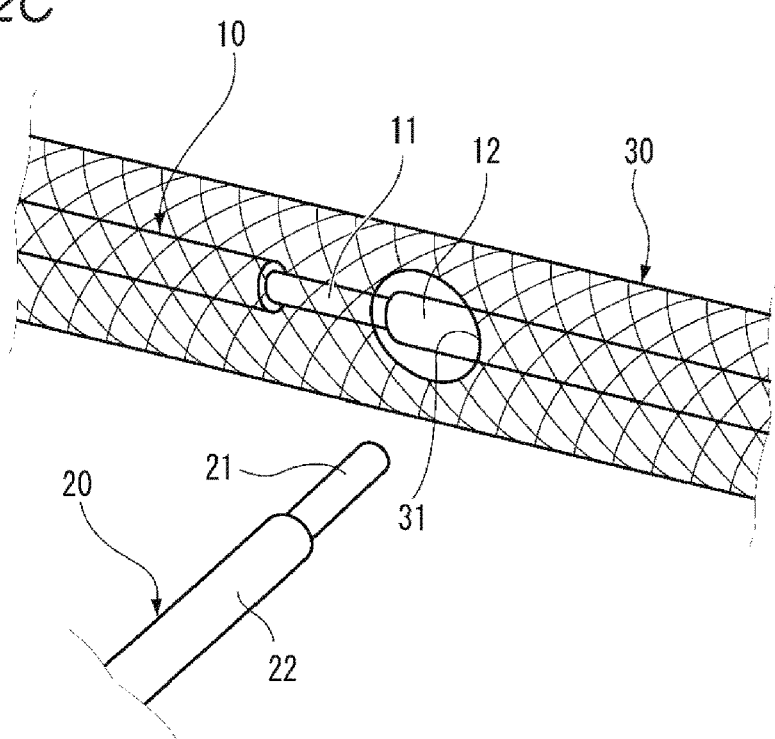
Figure 13A:
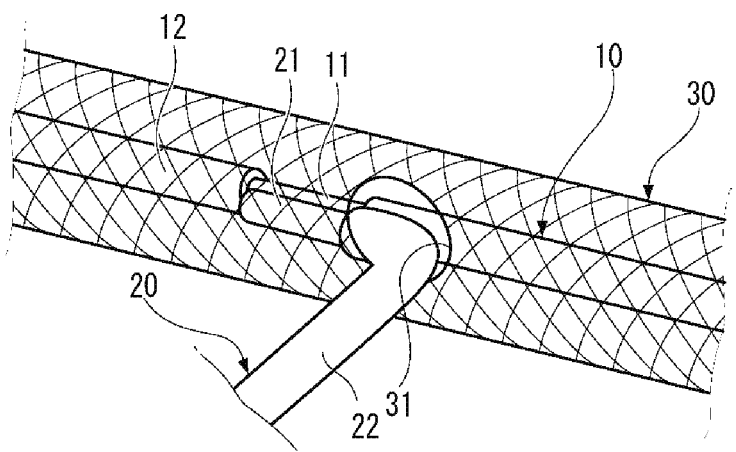
FIGS. 13A to 13C are diagrams for explaining the branching method of an electric wire according to the second embodiment.
Figure 13B:
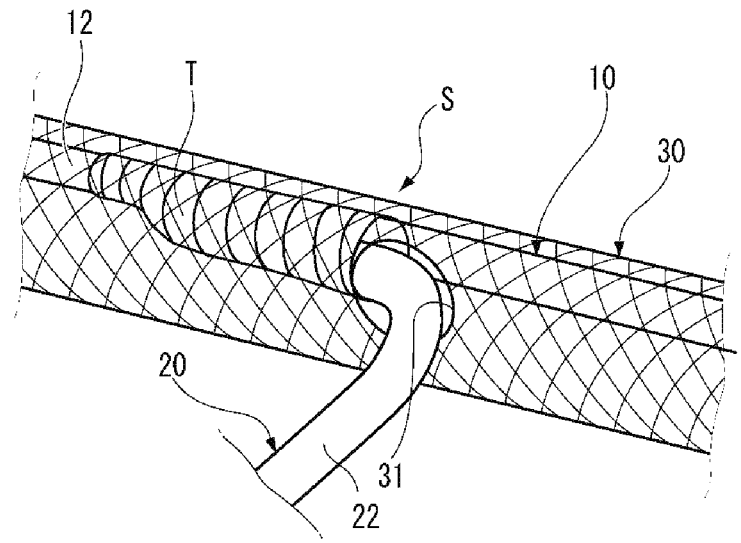
Figure 13C:
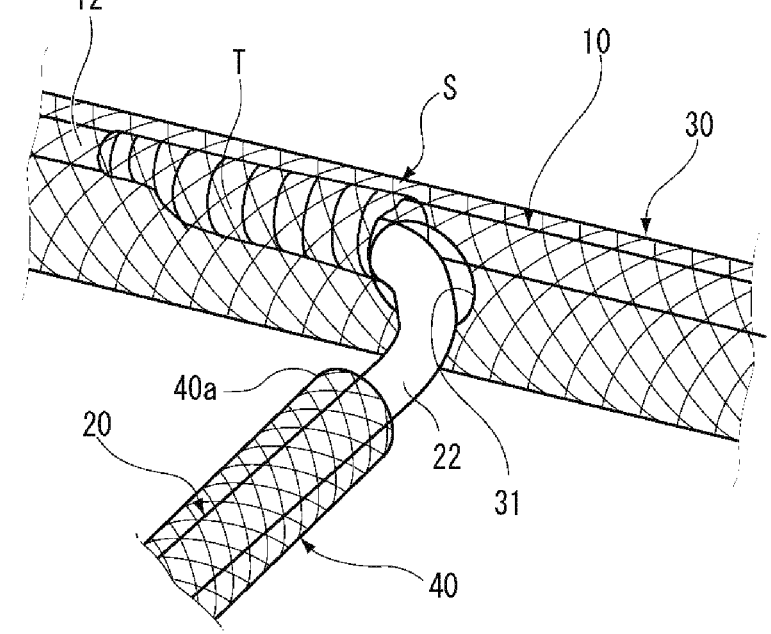
Figure 14A:
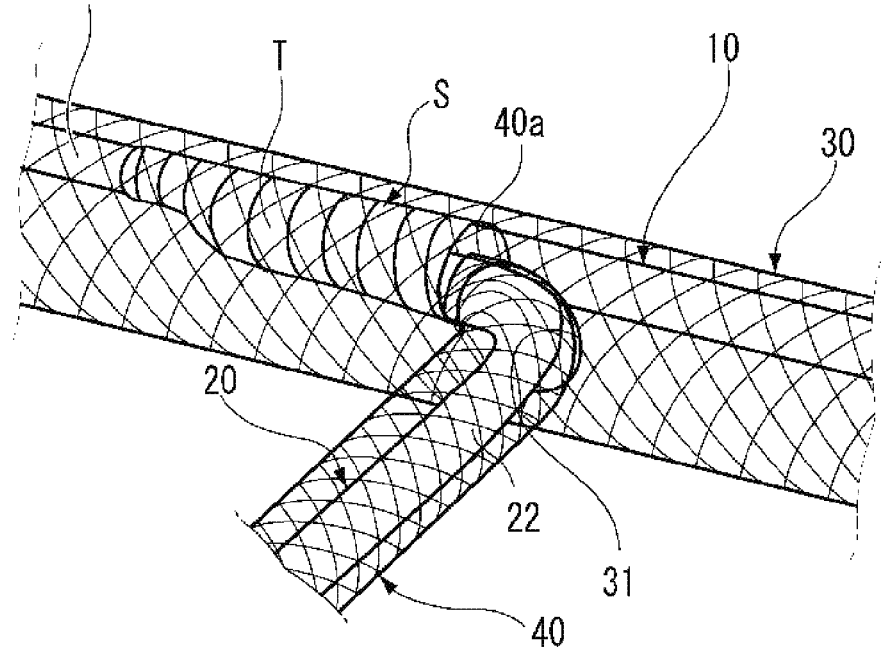
FIGS. 14A and 14B are diagrams for explaining the branching method of an electric wire according to the second embodiment.
Figure 14B:
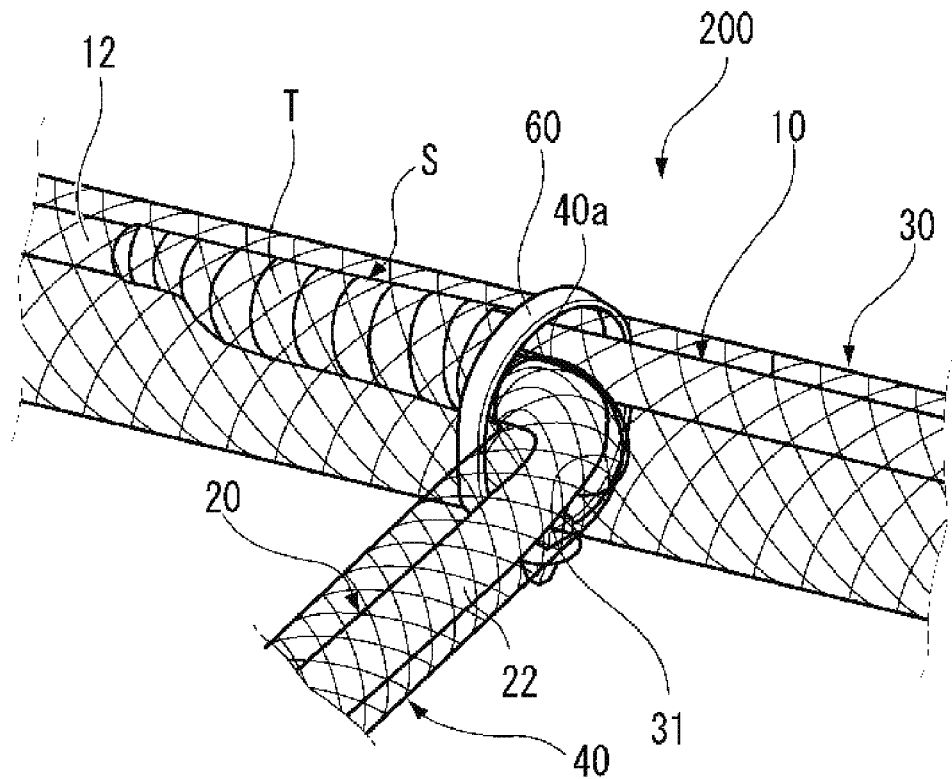

FIG. 12A is a perspective view of the first electric wire 10 covered with the first shield tube 30, FIG. 12B is a perspective view of the first electric wire 10 in a state where the opening 31 is formed in the first shield tube 30, and FIG. 12C is a perspective view of a state where the conductors 11 and 21 of the first electric wire 10 and the second electric wire 20 are exposed. FIG. 13A is a perspective view of a connection portion of the first electric wire 10 and the second electric wire 20, at which a terminal of the second electric wire 20 inserted into the opening 31 of the first shield tube 30, and the conductor of the first electric wire 10 are joined to each other. FIG. 13B is a perspective view of the branching portion S of the first electric wire 10 and the second electric wire 20 covered by insulating tape T, and FIG. 13C is a perspective view of the branching portion S of the first electric wire 10 and the second electric wire 20 in a state where the second shield tube 40 is loaded around the second electric wire 20. FIG. 14A is a perspective view of the branching portion S of the first electric wire 10 and the second electric wire 20 in a state where the end portion 40a of the second shield tube 40 is inserted into the opening 31 of the first shield tube 30, and FIG. 14B is a perspective view of the branching portion S of the first electric wire 10 and the second electric wire 20 in a state of being coupled with the coupling band 60.

(First Shielding Process)

As illustrated in FIG. 12A, the first electric wire 10 is passed through the first shield tube 30. As a result, the periphery of the first electric wire 10 is covered with the first shield tube 30.

(Wire Connection Process)

As illustrated in FIG. 12B, an opening 31 is formed in the vicinity of the branching portion in the first shield tube 30 where the second electric wire 20 is branched from the first electric wire 10. Next, as illustrated in FIG. 12C, a portion of the outer sheath 12 is removed from the branching portion of the first electric wire 10 to expose the conductor 11. In addition, the outer sheath 22 of the terminal of the second electric wire 20 is removed to expose the conductor 21.

Then, as illustrated in FIG. 13A, the exposed conductors 11 and 21 of the first electric wire 10 and the second electric wire 20 are joined to each other, and the terminal of the second electric wire 20 inserted through the opening 31 and the first electric wire 10 are electrically connected. Further, as illustrated in FIG. 13B, the insulating tape T is wound around the connection portion of the conductors 11 and 12 of the first electric wire 10 and the second electric wire 20 to form the branching portion S that is protected and waterproofed.

In the wire connecting process, the joining operation of joining the conductors 11 and 21 of the first electric wire 10 and the second electric wire 20 to each other, and the tape winding operation of winding the insulating tape T around the connection portion are performed, for example, inside the first shield tube 30 through the opening 31. In addition, the branching portion of the first electric wire 10 may be drawn out through the opening 31 and the joining operation and the tape winding operation are performed outside the first shield tube 30, and then the branching portion S may be returned into the first shield tube 30.

(Second Shielding Process)

As illustrated in FIG. 13C, the second electric wire 20, whose terminal is connected to the branching portion S and extends outward through the opening 31 of the first shield tube 30, is passed through the second shield tube 40. As a result, the periphery of the second electric wire 20 is covered with the second shield tube 40.

(Shield Tube Joining Process)

As illustrated in FIG. 14A, the end portion 40a of the second shield tube 40, in which the second electric wire 20 is passed, is inserted through the opening 31 into the first shield tube 30 and bent toward the branching portion S side along the second electric wire 20. Next, as illustrated in FIG. 14B, the coupling band 60 is wound between the opening 31 and the branching portion S in the first shield tube 30, and thus, the end portion 40a of the second shield tube 40, and the first electric wire 10 and the second electric wire 20 are coupled with the coupling band 60. Therefore, the second shield tube 40 is joined to the first shield tube 30 without a gap.

Thus, the branching circuit body 200 is formed, in which the second electric wire 20 is branched from the first electric wire 10.

According to the electric wire branching method for branching electric wires according to the second embodiment described above, it is possible to easily branch the second electric wire 20 from the first electric wire 10 without using a branching device such as a branching box, a power distribution module, or a connector which is used in the reference example. As a result, with the simplified structure, the cost can be reduced and assembly work can be improved, and the size can be also reduced. Further, a high degree of freedom of the branching location is provided, and a high versatility can be obtained. Furthermore, it is possible to easily and securely join the second shield tube 40 to the first shield tube 30 by coupling the end portion 40a of the second shield tube 40 inserted into the opening 31 with the coupling band 60 and joining to the first shield tube 30. Accordingly, the first electric wire 10 and the second electric wire 20 can be shielded collectively and securely by the first shield tube 30 and the second shield tube 40, and a good shielding effect can be obtained.

The present invention is not limited to the embodiment described above, but can encompass modifications or improvement, as appropriate. In addition, materials, shapes, dimensions, numbers, arrangement positions, and the like of the constituent elements in the embodiment described above are not limited, but rather arbitrary as far as the present invention can be achieved.

For example, in the first embodiment, the connection portion of the conductors 11 and 21 of the first electric wire 10 and the second electric wire 20 are covered by the mold part 50 to be protected and waterproofed, but the connection portion of the conductors 11 and 12 may be wound by insulating tape or the like to be protected and waterproofed.

Further, the first shield tube 30 and the second shield tube 40 are not limited to a tube formed of a braided material obtained by knitting strands into a tube shape, but may be formed by forming a conductive metal foil such as aluminum or copper into a tubular shape.

In addition, it is needless to say that the number of the first electric wires 10 and second electric wires 20 is not limited to the embodiments described above, and is increased or decreased depending on the circuit.

Here, the features of the embodiment of the branching circuit body and the branching method of an electric wire according to the present invention described above are briefly summarized and listed as to below.

[1] A branching circuit body (100, 100A, 100B, or 100C) including,
  a first electric wire (10),
  a first shield tube (30) covering the first electric wire (10),
  a second electric wire (20) electrically connected to the first electric wire (10) and drawn out through an opening (31) formed in the first shield tube (30),
  a second shield tube (40) covering the second electric wire (20) and having an end portion (40a) inserted into the opening (31), and
  a joining unit (40) for joining the second shield tube (40) to the first shield tube (30).

[2] The branching circuit body (100, 100A, 100B, or 100C) according to [1], including a mold part (50) that covers a connection portion of the first electric wire (10) and the second electric wire (20).

[3] The branching circuit body (100 or 100A) according to [1] or [2], in which the joining unit is configured with a coupling member (coupling band 60) for coupling an end portion (40a) of the second shield tube (40) inserted into the opening (31) to join the end portion to the first shield tube (30).

[4] The branching circuit body (100B) according to [1] or [2], in which the joining unit includes a holding member (holder 70) which covers and holds the opening (31), into which the end portion (40a) of the second shield tube (40) is inserted, and a periphery thereof.

[5] The branching circuit body (100C) according to [1] or [2], in which the joining unit is a welding unit for welding an edge of the opening (31) and a periphery of the second shield tube (40).

[6] A branching method of an electric wire, which branches a second electric wire (20) from a first electric wire (10) and collectively shields the first electric wire (10) and the second electric wire (20), the method including,
  a wire connecting process of electrically connecting the first electric wire (10) and the second electric wire (20),
  a first shielding process of passing the first electric wire (10) and the second electric wire (20) through a first shield tube (30), a drawing-out process of forming an opening (31) in the vicinity of the connection portion of the first electric wire (10) and the second electric wire (20) in the first shield tube (30) and drawing out the second electric wire (20) through the opening (31), a second shielding process of passing the second electric wire (20) through a second shield tube (40), and a shield tube joining process of inserting and joining an end portion (40a) of the second shield tube (40) into the opening (31).

[7] The method according to [6], further including a molding process of forming a mold part (50) for covering the connection portion of the first electric wire (10) and the second electric wire (20) connected to each other in the electric wire connecting process.

[8] A branching method of an electric wire, which branches a second electric wire (20) from a first electric wire (10) and collectively shields the first electric wire (10) and the second electric wire (20), the method including, a first shielding process of passing the first electric wire (10) through a first shield tube (30), and a wire connecting process of forming an opening (31) in the vicinity of a branching portion where the second electric wire (20) is branched from the first electric wire (10) in the first shield tube (30), and electrically connecting a terminal of the second electric wire (20) inserted through the opening (31) to the first electric wire (10), a second shielding process of passing the second electric wire (20) through a second shield tube (40), and a shield tube joining process of inserting and joining an end portion (40a) of the second shield tube (40) into the opening (31).

What is claimed is:

1. A branching circuit body comprising:
a first electric wire;
a first shield tube that covers the first electric wire;
a second electric wire that is electrically connected to the first electric wire without a connector and drawn out through an opening formed in the first shield tube;
a second shield tube that covers the second electric wire and has an end portion inserted into the opening;
a joining unit for joining the second shield tube to the first shield tube; and
a mold part formed of an insulating resin and provided in a connection portion of the first electric wire and the second electric wire,
wherein the mold part has a connecting surface whose upper and lower surfaces are uneven.

2. The branching circuit body according to claim 1,
wherein the joining unit includes a coupling member for coupling the end portion of the second shield tube, which is inserted into the opening to the first shield tube.

3. The branching circuit body according to claim 1,
wherein the joining unit includes a holding member that covers and holds the opening, into which the end portion of the second shield tube is inserted, and a periphery thereof.

4. The branching circuit body according to claim 1,
wherein the joining unit is a welding unit for welding an edge of the opening and a periphery of the second shield tube.

5. A branching method of an electric wire that branches a second electric wire from a first electric wire and collectively shields the first electric wire and the second electric wire, the branching method comprising:
a wire connecting process of electrically connecting the first electric wire and the second electric wire without a connector;
a first shielding process of passing the first electric wire and the second electric wire through a first shield tube;
a drawing-out process of forming an opening in the vicinity of a connection portion of the first electric wire and the second electric wire in the first shield tube and drawing out the second electric wire through the opening;
a second shielding process of passing the second electric wire through a second shield tube;
a shield tube joining process of inserting and joining an end portion of the second shield tube into the opening; and
a molding process of forming a mold part for covering the connection portion of the first electric wire and the second electric wire connected to each other in the electric wire connecting process,
wherein the mold part has a connecting surface whose upper and lower surfaces are uneven, and
wherein the mold parts arranged on a top and bottom are engaged by mating uneven portions of the upper and lower surfaces of the connecting surface to each other.

6. A branching method of an electric wire that branches a second electric wire from a first electric wire and collectively shields the first electric wire and the second electric wire, the branching method comprising:
a first shielding process of passing the first electric wire through a first shield tube;
a wire connecting process of forming an opening in the vicinity of a branching portion at which the second electric wire is branches from the first electric wire in the first shield tube, and electrically connecting a terminal of the second electric wire, which is inserted through the opening to the first electric wire without a connector;
a second shielding process of passing the second electric wire through a second shield tube;
a shield tube joining process of inserting and joining an end portion of the second shield tube into the opening; and
a molding process of forming a mold part for covering a connection portion of the first electric wire and the second electric wire connected to each other in the electric wire connecting process,
wherein the mold part has a connecting surface whose upper and lower surfaces are uneven, and
wherein the mold parts arranged on a top and bottom are engaged by mating uneven portions of the upper and lower surfaces of the connecting surface to each other.

* * * * *